(12) United States Patent
Burmistrov et al.

(10) Patent No.: US 11,482,238 B2
(45) Date of Patent: Oct. 25, 2022

(54) AUDIO-VISUAL SOUND ENHANCEMENT

(71) Applicant: HARMAN INTERNATIONAL INDUSTRIES, INCORPORATED, Stamford, CT (US)

(72) Inventors: Evgeny Burmistrov, Saratoga, CA (US); Joseph Verbeke, San Francisco, CA (US); Priya Seshadri, San Francisco, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/934,791

(22) Filed: Jul. 21, 2020

(65) Prior Publication Data
US 2022/0028406 A1   Jan. 27, 2022

(51) Int. Cl.
*G10L 21/0272*  (2013.01)
*G06F 3/01*  (2006.01)
*G10L 25/51*  (2013.01)
*G06K 9/62*  (2022.01)
*G06T 7/20*  (2017.01)
*H04R 1/32*  (2006.01)
*H04R 1/08*  (2006.01)
*H04R 3/00*  (2006.01)
(Continued)

(52) U.S. Cl.
CPC .......... *G10L 21/0272* (2013.01); *G06F 3/013* (2013.01); *G06K 9/6217* (2013.01); *G06T 7/20* (2013.01); *G06V 10/40* (2022.01); *G06V 20/10* (2022.01); *G10L 25/30* (2013.01); *G10L 25/51* (2013.01); *H04R 1/08* (2013.01); *H04R 1/326* (2013.01); *H04R 3/00* (2013.01); *G06T 2207/20084* (2013.01)

(58) Field of Classification Search
None
See application file for complete search history.

(56) References Cited

U.S. PATENT DOCUMENTS

2010/0074460 A1  3/2010  Marzetta
2010/0315482 A1  12/2010 Rosenfeld et al.
(Continued)

FOREIGN PATENT DOCUMENTS

EP   2 565 600 A1   3/2013

OTHER PUBLICATIONS

International Search Report for Application No. PCT/US2016/014173, dated May 13, 2016, 9 pages.
(Continued)

*Primary Examiner* — Paul W Huber
(74) *Attorney, Agent, or Firm* — Artegis Law Group, LLP

(57) ABSTRACT

Embodiments of the present disclosure sets forth a computer-implemented method comprising acquiring image information associated with an environment, acquiring, from one or more sensors, sensor data associated with a gaze of a user, determining a source of interest based on the image information and the sensor data, processing a set of audio signals associated with the environment based on the image information to identify an audio signal associated with the source of interest, enhancing the audio signal associated with the source of interest relative to other audio signals in the set of audio signals, and outputting the enhanced audio signal associated with the source of interest to the user.

19 Claims, 14 Drawing Sheets

(51) Int. Cl.
  *G10L 25/30* (2013.01)
  *G06V 10/40* (2022.01)
  *G06V 20/10* (2022.01)

(56) References Cited

U.S. PATENT DOCUMENTS

| | | |
|---|---|---|
| 2012/0163625 A1 | 6/2012 | Siotis et al. |
| 2012/0215519 A1 | 8/2012 | Park et al. |
| 2013/0329923 A1 | 12/2013 | Bouse |
| 2014/0039576 A1 | 2/2014 | Hillbratt |
| 2014/0267076 A1 | 9/2014 | Birnbaum et al. |
| 2014/0361987 A1* | 12/2014 | Bickerstaff ............. G06F 3/017 345/156 |
| 2015/0110285 A1 | 4/2015 | Censo et al. |
| 2016/0192073 A1 | 6/2016 | Poornachandran et al. |
| 2018/0270571 A1 | 9/2018 | Di Censo et al. |
| 2020/0265860 A1* | 8/2020 | Mouncer .................. H04R 5/04 |

OTHER PUBLICATIONS

Ephrat et al., "Looking to Listen at the Cocktail Party: A Speaker-Independent Audio-Visual Model for Speech Separation", ACM Trans. Graph., vol. 37, No. 4, Article 112, https://doi.org/10.1145/3197517.3201357, Aug. 2018, pp. 112:1-112:11.

* cited by examiner

AUDIO-VISUAL SOUND ENHANCEMENT

BACKGROUND

Field of the Various Embodiments

The disclosed embodiments relate generally to audio systems and, more specifically, to techniques for audio-visual sound enhancement.

DESCRIPTION OF THE RELATED ART

A user may encounter various situations where the user may want to hear sounds from one source among many sources of sounds in an environment. For example, a user may be attending a large gathering of people (e.g., a party, a trade show), where the environment includes many sounds from different sources. The user at the gathering may want to focus on hearing speech from a particular person amongst the many people at the gathering. Hearing speech from the particular person can be a challenge because of the presence of sounds from multiple other sources (e.g., other people, background sounds) in the environment.

One response to this challenge is the use of personal sound amplification products. Typically, these personal sound amplification products receive sounds coming from around the user, amplify the sounds, and output the amplified sounds to the user. A drawback of these products is that these products amplify sound indiscriminately. Even if the product includes a directional microphone, the product amplifies all of the received sounds received by the directional microphone. Accordingly, both desirable and undesirable sounds are subject to amplification, which does not always facilitate user focus on the desirable sounds.

Another response to this challenge is the use of devices with sound isolation capabilities. For example, a device can process received sounds, separate sounds by type, and amplify the desired type of sounds. A drawback of these devices is that these devices do not differentiate between sources of the same type—this approach to sound isolation does not separate sounds from different sources of the same type. Thus, these devices are less effective when there are multiple sources of the same type and the user is interested in sounds from one of these multiple sources, such as one human speaker amongst multiple human speakers.

As the foregoing illustrates, what is needed are more effective techniques for sound enhancement.

SUMMARY

One embodiment sets forth a computer-implemented method comprising acquiring image information associated with an environment, acquiring, from one or more sensors, sensor data associated with a gaze of a user, determining a source of interest based on the image information and the sensor data, processing a set of audio signals associated with the environment based on the image information to identify an audio signal associated with the source of interest, enhancing the audio signal associated with the source of interest relative to other audio signals in the set of audio signals, and outputting the enhanced audio signal associated with the source of interest to the user.

Further embodiments provide, among other things, one or more computer-readable storage media and a system configured to implement the methods set forth above.

A technical advantage and improvement of the disclosed techniques is that sounds associated with a source of interest, including human and non-human sources, can be more precisely enhanced, compared to conventional techniques. Accordingly, desirable sounds can be provided to the user more precisely, facilitating better focus on the desired sounds. Another advantage and improvement is that the source of interest can be tracked, thus facilitating enhancement of sounds originating from the source of interest without requiring that the source of interest and/or the user remain stationary.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1A:
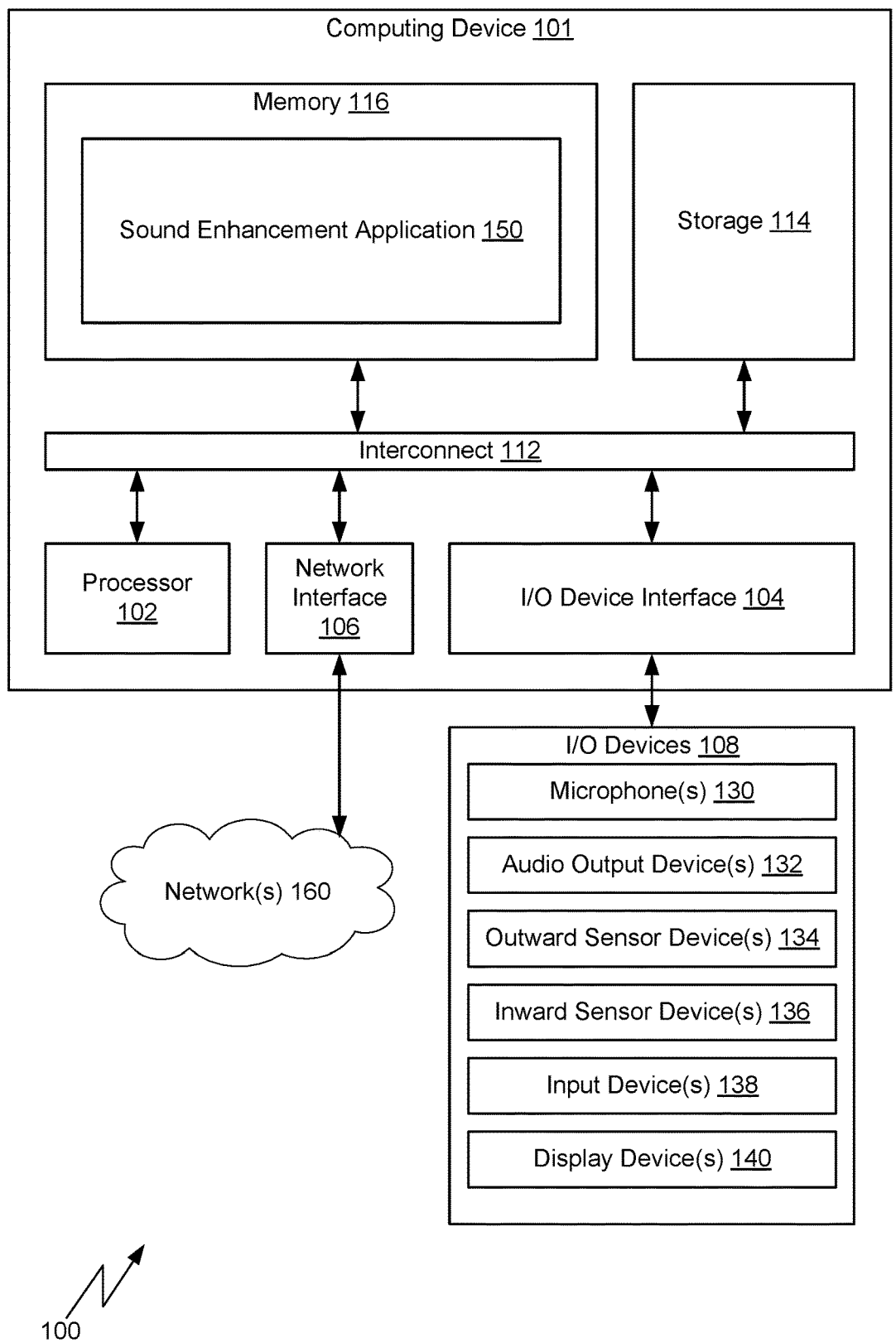
FIG. 1A illustrates a sound enhancement system configured to implement one or more aspects of the various embodiments.

FIG. 1A illustrates a sound enhancement system 100 configured to implement one or more aspects of the various embodiments. In various embodiments, sound enhancement system 100 may be incorporated into a wearable system (e.g., a head, ear, shoulder, or other type of body-mounted system, an attachment or add-on that can be attached to or mounted on a wearable object), and a user can wear the wearable sound enhancement system 100 in an environment. For example, sound enhancement system 100 could be implemented in a head-wearable form factor (e.g., a wearable frame resembling conventional eyeglasses, a headset, smart glasses, etc.). As another example, sound enhancement system 100 could be implemented as an attachment that can be attached to or mounted on an eyeglasses frame. Sound enhancement system 100 includes a variety of sensors, as described in greater detail below.

As shown, sound enhancement system 100 includes, without limitation, computing device 101, input/output (I/O) device(s) 108, and optionally network(s) 160. Computing device 101 includes a processor 102, I/O device interface 104, network interface 106, interconnect 112 (e.g., a bus), storage 114, and memory 116. Memory 116 stores sound enhancement application 150. Processor 102 and memory 116 may be implemented in any technically feasible fashion. For example, and without limitation, in various embodiments, any combination of processor 102 and memory 116 may be implemented as a stand-alone chip or as part of a more comprehensive solution that is implemented as an application-specific integrated circuit (ASIC), a system-on-a-chip (SoC), and/or the like. Processor 102, I/O device interface 104, network interface 106, storage 114, and memory 116 can be communicatively coupled to each other via interconnect 112.

The one or more processors 102 may include any suitable processor, such as a central processing unit (CPU), a graphics processing unit (GPU), an application-specific integrated circuit (ASIC), a field programmable gate array (FPGA), a tensor processing unit (TPU), any other type of processing unit, or a combination of multiple processing units, such as a CPU configured to operate in conjunction with a GPU. In general, each of the one or more processors 102 may be any technically feasible hardware unit capable of processing data and/or executing software applications and modules.

Storage 114 may include non-volatile storage for applications, software modules, and data, and may include fixed or removable disk drives, flash memory devices, and CD-ROM, DVD-ROM, Blu-Ray, HD-DVD, or other magnetic, optical, solid state storage devices, and/or the like.

Memory 116 may include a random access memory (RAM) module, a flash memory unit, or any other type of memory unit or combination thereof. The one or more processors 102, I/O device interface 104, and network interface 106 are configured to read data from and write data to memory 116. Memory 116 includes various software programs and modules (e.g., an operating system, one or more applications) that can be executed by processor 102 and application data (e.g., data loaded from storage 114) associated with said software programs.

In some embodiments, computing device 101 is communicatively coupled to one or more networks 160. Network(s) 160 may be any technically feasible type of communications network that allows data to be exchanged between computing device 101 and remote systems or devices (not shown), such as a server, a cloud computing system, or other networked computing device or system. For example, network(s) 160 may include a wide area network (WAN), a local area network (LAN), a wireless network (e.g., a Wi-Fi network, a cellular data network), and/or the Internet, among others. Computing device 101 may connect with network(s) 160 via network interface 106. In some embodiments, network interface 106 is hardware, software, or a combination of hardware and software, that is configured to connect to and interface with network(s) 160.

In some embodiments, computing device 101 is communicatively coupled to a local device separate from computing device 101. For example, computing device 101 could be paired with another device (e.g., smartphone, tablet computer, notebook or desktop computer) associated with the user and located in proximity to computing device 101. Computing device 101 may be coupled to the another device via network interface 106 (e.g., via network(s) 160) or via I/O device interface 104 by wire or wirelessly in any technically feasible manner (e.g., Universal Serial Bus (USB), Bluetooth, ad-hoc Wi-Fi).

I/O devices 108 may include devices capable of providing input, as well as devices capable of providing output, such as a display device, audio output device, etc. For example, in various embodiments, I/O devices 108 include microphone(s) 130, audio output device(s) 132, one or more input device(s) 138, and optionally one or more display devices 140. Examples of input devices 138 include, without limitation, a touch-sensitive surface (e.g., a touchpad), a touch-sensitive screen, buttons, knobs, dials, and/or the like. Examples of display devices 140 include, without limitation, LCD displays, LED displays, touch-sensitive displays, transparent displays, projection systems, and/or the like. Additionally, I/O devices 108 may include devices capable of both receiving input and providing output, such as a touch-sensitive display, and/or the like.

Microphones 130 includes one or more microphones for receiving sounds from the environment. Microphones 130 may include, without limitation, unidirectional microphones, omnidirectional microphones, directional microphones, a microphone array, beam-forming microphones, microelectro-mechanical (MEMS) microphones, and/or the like. In implementations where sound enhancement system 100 is implemented in a wearable form factor, microphones 130 may be located at various positions on a chassis or frame of the wearable.

Audio output device(s) 132 include one or more devices capable of outputting sound to the user. In some embodiments, audio output devices 132 output sound to one or more ears of the user (e.g., for private listening by the user). Audio output device(s) 132 may include, without limitation, headphones, earbuds, headsets, bone conduction speakers, shoulder worn and shoulder mounted headphones, around-neck speakers, and/or the like.

I/O devices 108 further include one or more outward sensor devices 134 and one or more inward sensor devices 136. Outward sensor device(s) 134 monitor the environment around a user of sound enhancement system 100 and capture images of the environment, including sources of sounds in the environment. In various embodiments, outward sensor device(s) 134 include one or more imaging devices (e.g., an RGB camera, an infrared camera) for capturing images (e.g., still images, video, video frames) of the environment. In some embodiments, outward sensor device(s) 134 also include, without limitation, one or more depth cameras, thermal cameras, radar sensors, laser-based sensors, ultrasound-based sensors, and/or the like. Outward sensor device(s) 134 include at least a front-directed imaging device positioned and oriented to capture images (e.g., at 30 frames per second, at 60 frames per second) in front of and outward from the user. For example, in embodiments in which sound enhancement system 100 is implemented in a wearable form factor, the front-directed imaging device is oriented to capture images in front of the user wearing the frame or chassis of the wearable. In some embodiments, outward sensor device(s) 134 may include one or more additional imaging devices positioned and oriented to capture images (e.g., still images, video, video frames) to the sides and/or rear of sound enhancement system 100 and/or the user. Accordingly, a field of view of the imaging device(s) of outward sensor device(s) 134 includes at least a front field of view (e.g., field of view 204, FIG. 2A) and optionally one or more fields of view for the sides and/or the rear. Depending on the number of imaging devices, and the positioning and orientation of the imaging devices, the total field of view of outward sensor device(s) 134 can be 360 degrees around the user. In some embodiments, at least one outward sensor device 134 includes an actuation mechanism. The actuation mechanism, which can be activated by sound enhancement application 150, mechanically moves and/or reorients outward sensor device to move and/or reorient the field of view of the outward sensor device. The actuation mechanism can be implemented in any technically feasible manner.

Inward sensor device(s) 136 monitor the user of sound enhancement system 100. In particular, inward sensor device(s) 136 measure and/or monitor various characteristics associated with the eyes of the user (e.g., eye position, eye movement, eye vergence) that may be used to determine an eye gaze direction and/or an eye gaze depth (or distance) of the user. In embodiments in which sound enhancement system 100 is implemented in a wearable form factor, inward sensor device(s) 136 monitor the user wearing the wearable. In some embodiments, inward sensor device(s) 136 include one or more imaging devices positioned and oriented to capture images of one or both eyes of the user. The images of the eye(s) may be used to determine eye position, eye movement, eye vergence, etc., which in turn can be used to determine eye gaze direction and/or eye gaze depth. Additionally or alternatively, inward sensor device(s) 136 include electrooculography sensors (e.g., pairs of electrodes) for generating electrooculography data for at least one eye of the user. In some embodiments, electrooculography data can be used to determine various characteristics associated with the eyes (e.g., eye position, eye movement). Inward sensor device(s) 136 may include one or more sensors (e.g., the imaging devices) for measuring and/or monitoring an eye vergence of the eyes of the user. In some embodiments, inward sensor device(s) 136 include an eye tracking system that is configured to determine the eye gaze direction and/or eye gaze depth of the user by measuring characteristics associated with the eyes of the user (e.g., eye position, eye movement, etc.) in any technically feasible manner.

Memory 116 includes a sound enhancement application 150. Sound enhancement application 150 may be stored in and loaded from storage 114. In operation, sound enhancement application 150 receives audio signals captured via microphone(s) 130. The audio signals captured via microphone(s) 130 and received by sound enhancement application 150 may be a mix of audio signals originating from multiple sources. Sound enhancement application 150 also receives image information (e.g., still images, video, video frames) of the environment via outward sensor device(s) 134 and sensor data associated with the eyes of the user (e.g., image information of the eyes, electrooculography data, etc.) via inward sensor device(s) 136. Sound enhancement application 150 determines a current (e.g., real-time, near real-time) eye gaze direction and eye gaze depth of the user based on the sensor data associated with the eyes of the user, and determines a current eye gaze focus based on the eye gaze direction and depth. Sound enhancement application 150 processes the image information of the environment to recognize sources of sounds (e.g., recognize human faces) included in the images of the environment and determines a source on which the eye gaze focus is placed to determine an audio source of interest. Sound enhancement application 150 further processes the audio signals to extract audio features and processes the image information to extract visual features associated with the recognized sources. Sound enhancement application 150 separates the audio signals into per-source audio signals by combining the audio features with the visual features. Sound enhancement application 150 outputs the separated audio signal originating from the source of interest and/or suppresses audio signals not originating from the source of interest. For example, sound enhancement application 150 could amplify the audio signal originating from the source of interest (e.g., outputting just the separated or isolated audio signal originating from the source of interest) and/or suppress or cancel the audio signals not originating from the source of interest (e.g., cancelling audio signals other than the separated or isolated audio signal originating from the source of interest).

In some embodiments, operation of sound enhancement application 150 includes using one or more machine learning-based techniques (e.g., deep neural networks, convolutional neural networks, etc.). For example, sound enhancement application 150 could use a machine learning-based technique to separate the audio signals by source, by combining audio features with visual features. Models used by these machine learning-based techniques (e.g., pre-trained models, learning models) can be stored in storage 114 and loaded into memory 116 as appropriate. The models may be updated locally and/or via network(s) 160 (e.g., sound enhancement application 150 can train the model with additional data, updated models can be downloaded from a remote or cloud system via network(s) 160).

In various embodiments, sound enhancement application 150 processes the image information of the environment received from outward sensor device(s) 134 to recognize possible sound sources currently in the environment and in view of the user, including certain types of sources. In some embodiments, sound enhancement application 150 can process the image information to recognize human faces corresponding to persons as possible sources of sounds. Additionally or alternatively, sound enhancement application 150 can process the image information to recognize non-human sources, such as animals (e.g., dogs, cats) and/or inanimate objects (e.g., ocean waves, vehicles). In some embodiments, processing the image information to recognize faces include extracting visual features (e.g., frames and/or thumbnails that include human faces, frames and/or thumbnails showing specific lip positions of persons, sequences of frames and/or thumbnails showing specific lip motions of persons) from the image information. In some embodiments, the processing to recognize sources include applying a machine learning technique and an associated model to the image information. The model may be trained to recognize specific types of sources (e.g., humans, dogs, ocean waves, etc.). More generally, sound enhancement application 150 can use any technically feasible technique (e.g., machine learning-based techniques, face detection, object detection, etc.) to process the image information of the environment to recognize possible sources of sounds.

In some embodiments, the processing of the image information of the environment further includes processing the image information to recognize indicators of sound generation by recognized sources. For example, sound enhancement application 150 could recognize human lip positions and/or motions on recognized human faces. As described above, visual features extracted from the images of the environment may include frames or thumbnails showing lip positions and/or motions. As anther example, sound enhancement application 150 could recognize mouth movements, indicative of barking, on recognized dogs. As a further example, sound enhancement application 150 could recognize movements of ocean waves. Sound enhancement application 150 can use any technically feasible technique (e.g., machine learning-based techniques, face detection, object detection, etc.) to process the image information of the environment to recognize indicators of sound generation by recognized sources.

Sound enhancement application 150 determines an eye gaze direction and an eye gaze depth of the user. In some embodiments, sound enhancement application 150 determines various characteristics of the eyes (e.g., eye position, eye movement, eye vergence) based on sensor data associated with the eyes of the user (e.g., images of the eyes of the user and/or electrooculography data of the eyes of the user), and determines the eye gaze direction and eye gaze depth based on the eye characteristics. The images of the eyes and the electrooculography data can be captured via inward sensor device(s) 136. Sound enhancement application 150 may determine the eye characteristics, and in turn an eye gaze direction and an eye gaze depth using any technically feasible technique applied to the images and/or electrooculography data of the eyes. For example, sound enhancement application 150 could determine the eye position and eye movement of the eyes of the user from electrooculography data and determine an eye gaze direction based on the eye position and eye movement. As another example, sound enhancement application 150 could determine an eye vergence from the images and/or electrooculography data and determine an eye gaze depth based on the eye vergence. In some embodiments, inward sensor device(s) 136 could include optical biometry sensors (e.g., optical sensors, ultrasonic sensors) that can measure the curvature and/or the thickness of the lens of at least one eye of the user. Sound enhancement application 150 could determine a lens power (the refractive power of the lens) based on the lens curvature and/or thickness and determine an eye gaze depth based on the lens power. Sound enhancement application 150 can then determine an eye gaze focus of the user based on the eye gaze direction and eye gaze depth. The eye gaze focus indicates the direction and depth/distance on which the attention of the user 202 is placed based on eye activity. Sound enhancement application 150 can further compare the eye gaze focus of the user with image information of the environment to identify a recognized source in the field of view of outward sensor device(s) 134 (e.g., included in the image information) on which the eye gaze focus is placed. For example, sound enhancement application 150 could correlate the eye gaze focus with the image information of the environment to determine and identify a source recognized in the image information on which the eye gaze focus is placed as the source of interest. Sound enhancement application 150 can compare the eye gaze focus with an image of the environment captured with a depth or three-dimensional (3D) image of the environment that includes depth information (e.g., distance per pixel, RGBZ information). For example, sound enhancement application 150 could compare the eye gaze direction with the image, and compare the eye gaze depth with a depth image of the environment captured by a depth camera. Sound enhancement application 150 may enhance audio signals associated with this identified source on which the eye gaze focus is placed, the source of interest, relative to audio signals from other sources. In some embodiments, sound enhancement application 150 can determine the eye gaze direction and depth, and further determine the eye gaze focus, continuously, in real-time, and/or in near real-time (e.g., periodically, every 5 milliseconds).

Figure 4A:
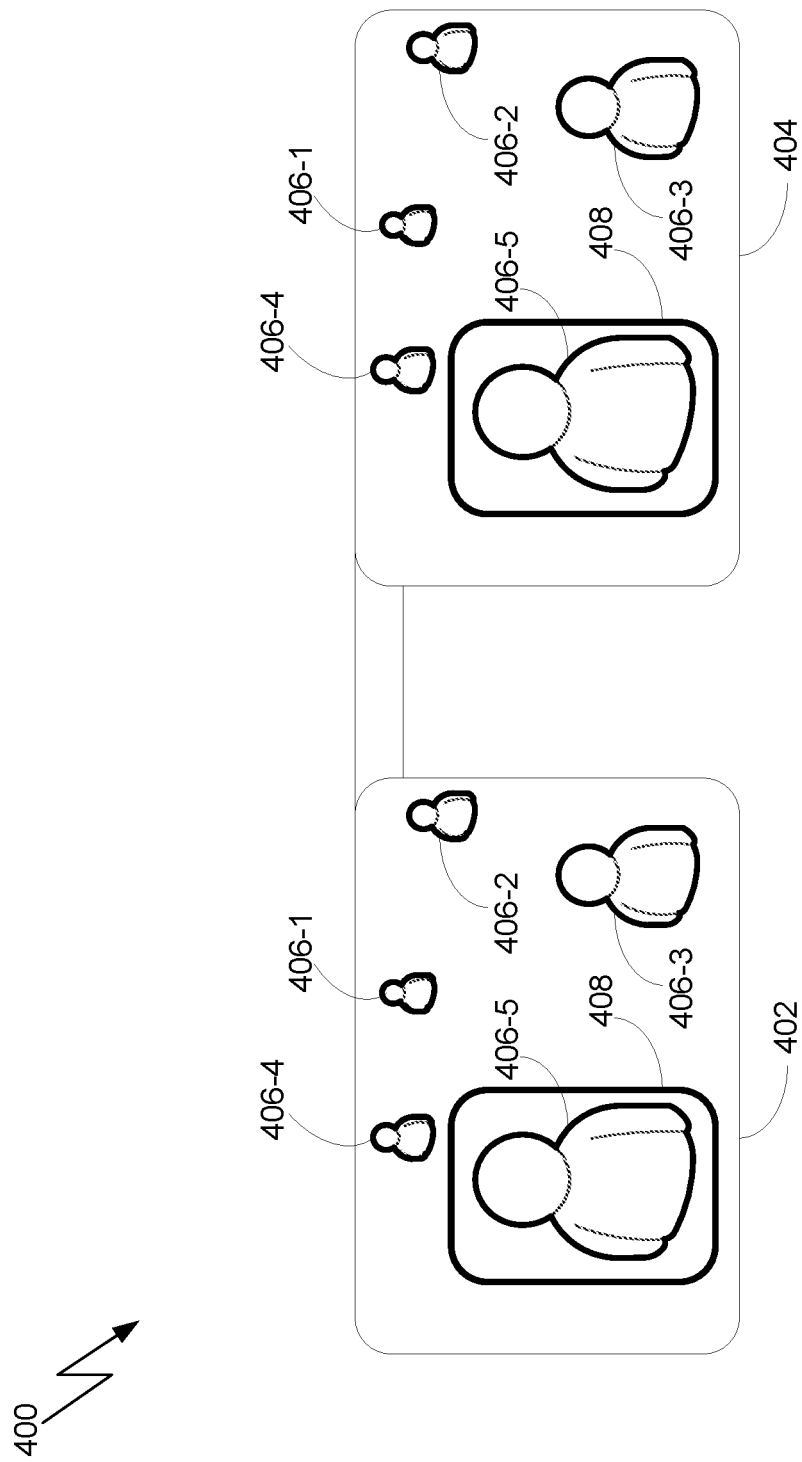
FIGS. 4A-4C illustrate the sound enhancement system of FIGS. 1A-1B providing visual feedback indicating the source of interest whose audio signals are to be or are being enhanced, according to various embodiments.
Figure 4B:
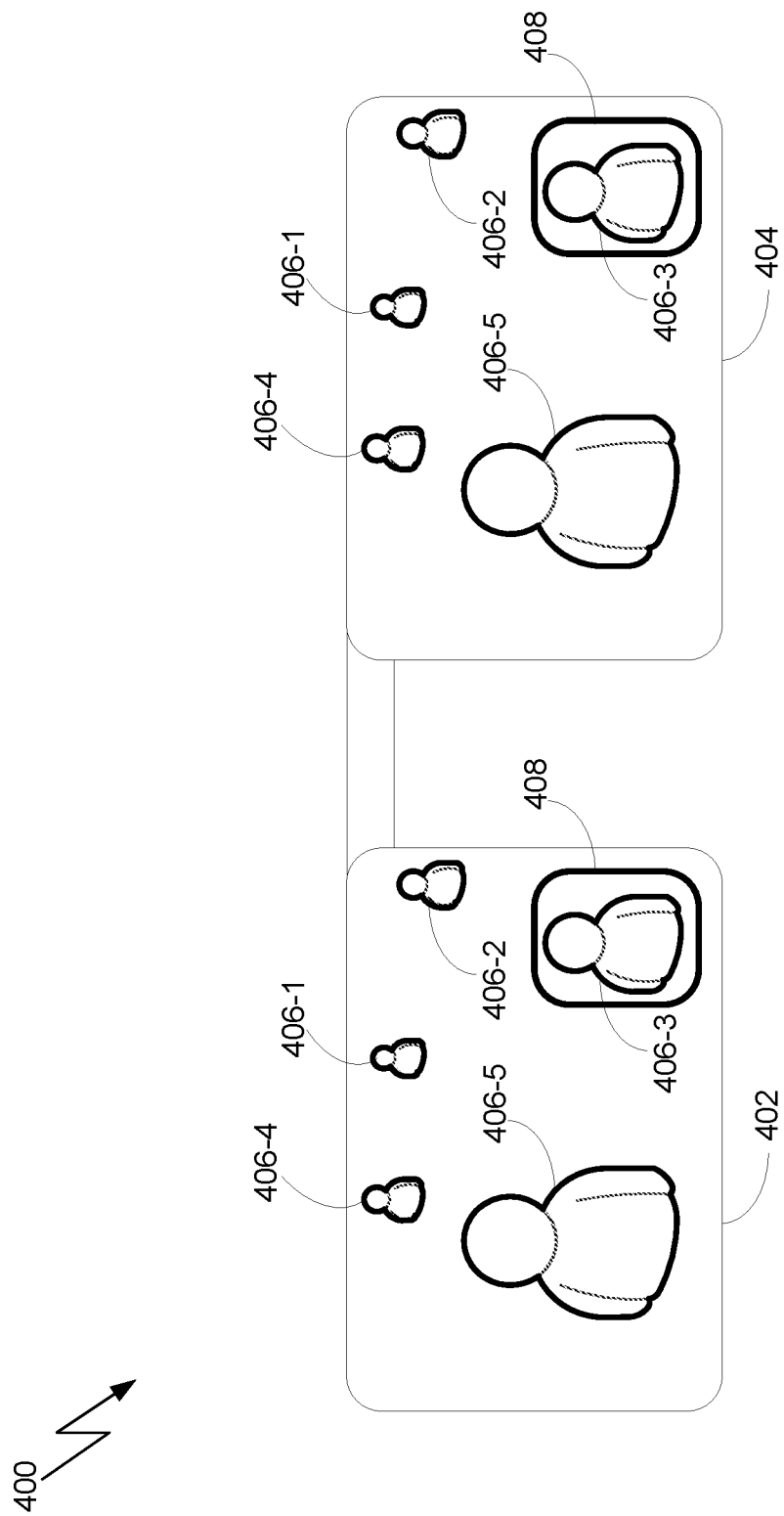
Figure 4C:
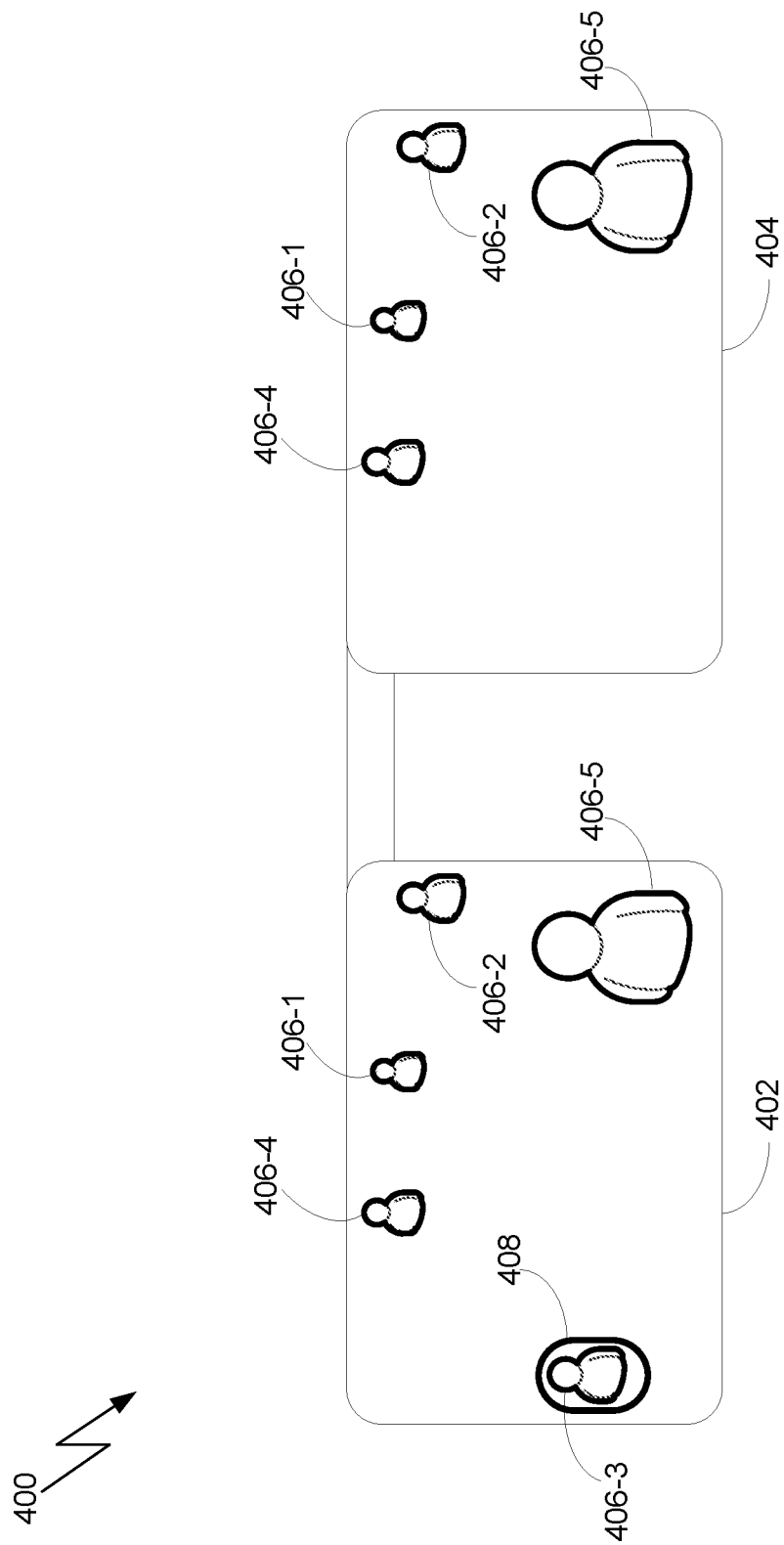

In some embodiments, when determining the source of interest, sound enhancement application 150 compares the eye gaze focus to image information of the environment captured over a period of time to determine whether placement of the eye gaze focus on a source exceeds a threshold amount of time (e.g., 3 seconds, 5 seconds). For example, sound enhancement application 150 could determine that the eye gaze focus on a certain source is intentional, and thus the source is the current source of interest, if the eye gaze focus is on the source for at least the threshold amount of time. Accordingly sound enhancement application 150 can distinguish intentional changes in eye gaze focus intended to change the source of interest (e.g., from no source to a source or vice versa, from one source to another source) from momentary changes in eye gaze focus not intended to change the source of interest (e.g., the user turns his head in reaction to a startling sound and then turns back). In some embodiments, the user can select a source of interest through other actions besides eye gaze focus. For example, the user could, via an input device 138 (e.g., a button, a touch-sensitive surface) or a microphone 130 (e.g., a voice command) manipulate a source of interest indicator (e.g., highlight box 408 as shown in FIGS. 4A-4C below) displayed on display device(s) 140 and select a source indicated by the indicator as the source of interest.

In some embodiments, sound enhancement application 150 extracts audio features from the audio signals received from microphones 130. In some embodiments, audio features are transforms (e.g., Fourier transform) or spectrogram representations of segments (e.g., 20-millisecond segments, 50-millisecond segments, 3-second segments) of the audio signals received from microphones 130.

Sound enhancement application 150 separates the audio signals received from microphones 130 into separate audio signals by source. In some embodiments, sound enhancement application 150 performs the separation by combining or matching audio features extracted from the audio signals with visual features extracted from image information of the environment. For example, sound enhancement application 150 can analyze the audio features and visual features to map audio features to visual features corresponding to the most likely source of the audio feature. Sound enhancement application 150 can separate the audio signals based on the audio feature to visual feature mappings.

In some embodiments, sound enhancement application 150 applies a machine learning-based audio signal separation technique to separate the audio signals by source. The machine learning-based technique can include a neural network (e.g., a deep neural network, a convolutional neural network) and associated model that is trained to match certain sounds to indicators of sound generation. For example, the neural network and associated model could be trained, with a training dataset of video segments with clean speech and a single speaker visible in the frames, to match sounds in the English language to human lip positions and/or motions. Inputs into the neural network are the extracted audio features and visual features described above. The neural network fuses audio features and visual features to generate joint audio-visual representations and, based on the joint audio-visual representations, time-frequency masks per source (e.g., per human speaker). The time-frequency masks are applied to the mix of audio signals received from microphones 130 to generate an isolated audio signal for each source included in the image information of the environment. With the mix of audio signals separated into isolated, per-source audio signals, sound enhancement application 150 may output the isolated audio signal originating from the source of interest via audio output devices 132 to the user, thereby enhancing the audio signal originating from the source of interest relative to audio signals from other sources.

In some embodiments, sound enhancement application 150 outputs the audio signal originating from the source of interest based on an enhancement mode. For example, sound enhancement application 150 may default to an enhancement-off mode, in which sound enhancement application 150 outputs to the user the un-separated audio signals received from microphones 130. The user may input a command (e.g., via a button in input devices 138, via a voice command captured by microphones 130) to change the mode to an enhancement-on mode, in which sound enhancement application 150 outputs an isolated audio signal originating from a source of interest (if a source of interest is identified) based on the eye gaze focus of the user. If sound enhancement application 150 identifies no source of interest, sound enhancement application 150 can output the un-separated audio signals. The user may issue a command to change the mode back to the enhancement-off mode; the enhancement mode (enhancement-on or enhancement-off) may be toggled. In some embodiments, sound enhancement application 150 continues to perform the above-described audio signal separation processing (e.g., determining the eye gaze focus, recognizing possible sources in the image information of the environment, extracting audio features and visual features, combining audio features with visual features, etc.) even in the enhancement-off mode. In some other embodiments, sound enhancement application 150 ceases performing the above-described audio signal separation processing when in the enhancement-off mode, and resumes performing the processing when in the enhancement-on mode.

In some embodiments, at least some of the processing to separate the audio signals described above may be off-loaded to a device communicatively coupled to (e.g., paired with) sound enhancement system 100. For example, the combination of audio features and visual features could be performed at a smartphone device paired with sound enhancement system 100. In this case, sound enhancement system 100 would transmit the images of the environment and the audio signal to the paired smartphone device, where a module can extract audio features and visual features and applies the machine learning technique to the extracted audio features and visual features.

By using an audio-visual technique of separating audio signal by source, as described above, sound enhancement application 150 can separate audio signals by source more cleanly compared to conventional techniques. Sound enhancement application 150 can selectively output the separate audio signal originating from the source of interest, and the output audio signal, because of the cleaner separation, is less distorted by other audio signals in the environment and around the user.

Figure 1B:
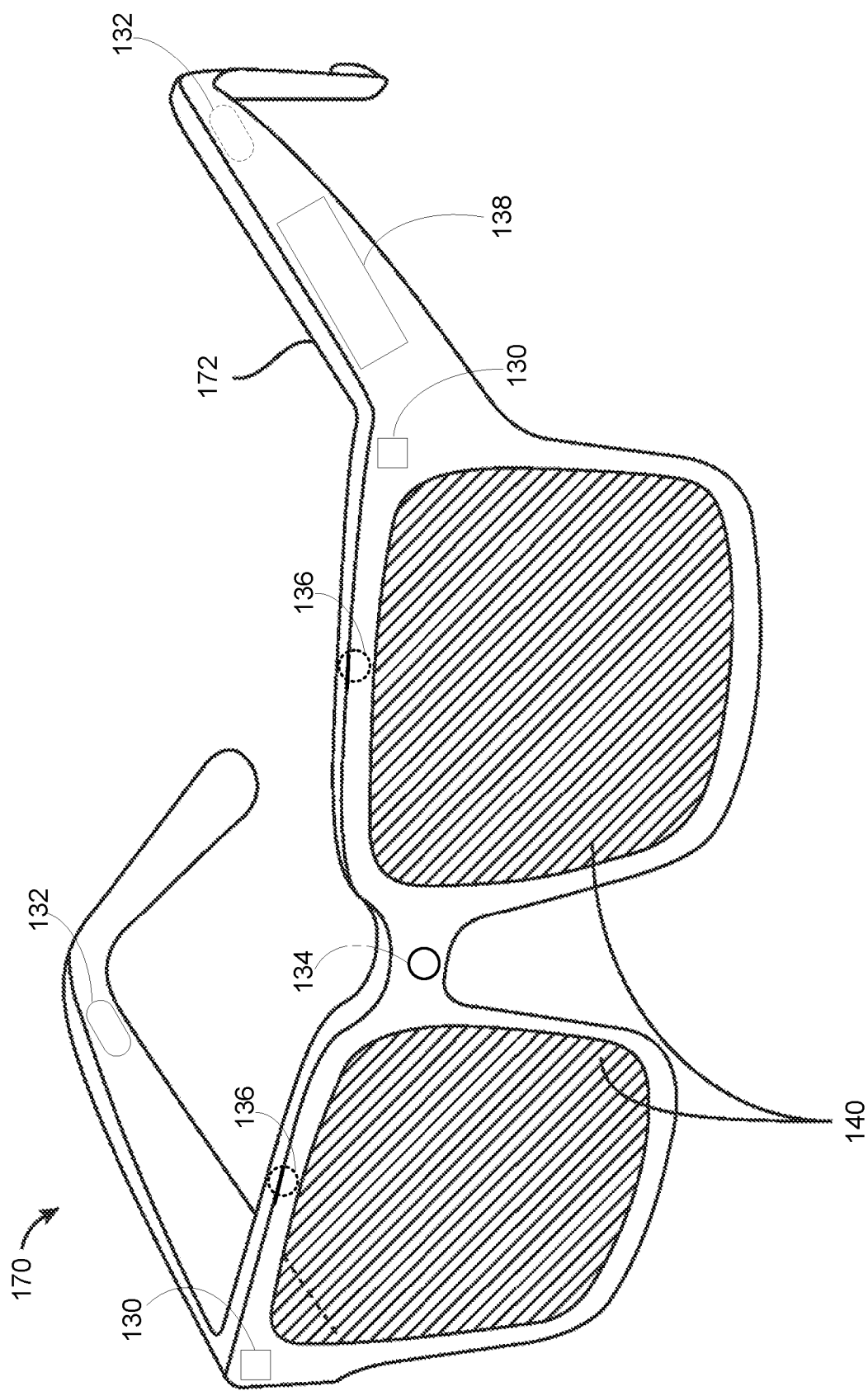
FIG. 1B illustrates a wearable implementation of the sound enhancement system of FIG. 1A, according to various embodiments.

As described above, sound enhancement system 100 may be implemented in a wearable form factor. FIG. 1B illustrates a wearable implementation of sound enhancement system 100, according to various embodiments. Wearable implementation 170 includes a frame 172 wearable on a head of a user. Frame 172 may resemble eyeglasses or sunglasses in appearance. Various components of sound enhancement system 100 are integrated into frame 172. As shown, frame 172 includes an outward sensor device 134 located on the bridge of frame 172. Outward sensor device 134 in frame 172 has a field of view directed outward from frame 172 and from a user wearing frame 172 (e.g., forward from the user wearing frame 172). Frame 172 may further include additional outward sensor devices 134 (e.g., located on the temples, the rims, etc.) with fields of view directed outward from frame 172 and the user. Frame 172 also includes inward sensor devices 136 located on the inside surface of either rim. Inward sensor devices 136 have fields of view directed toward the eyes of the user wearing frame 172. Frame 172 may further include additional inward sensor devices 136 (e.g., electrodes located on the temples, etc.). Frame 172 further includes microphones 130 located on either rim, proximate to where the rims and the temples connect. Frame 172 also includes display devices 140 (e.g., transparent displays) serving as the lenses of frame 172.

Frame 172 further includes audio output devices 132 (e.g., bone conduction speakers) located on the inside surface of either temple. Additionally or alternatively, frame 172 may be communicatively coupled (e.g., by wire, wirelessly) to separate audio output devices 132 (e.g., headphones, earbuds). Frame 172 also includes an input device 138 on one temple, and optionally on the other temple as well (not shown). The input device 138 may be, for example, a button or a touch-sensitive surface.

Frame 172 may further include other components of computing device 101 embedded within. For example, frame 172 could include processor 102, storage 114, memory 116, etc. embedded within frame 172. Additionally or alternatively, frame 172 may be paired with a separate device (e.g., a smartphone) that includes similar components as computing device 101 and performs functions associated with computing device 101.

Figure 2A:
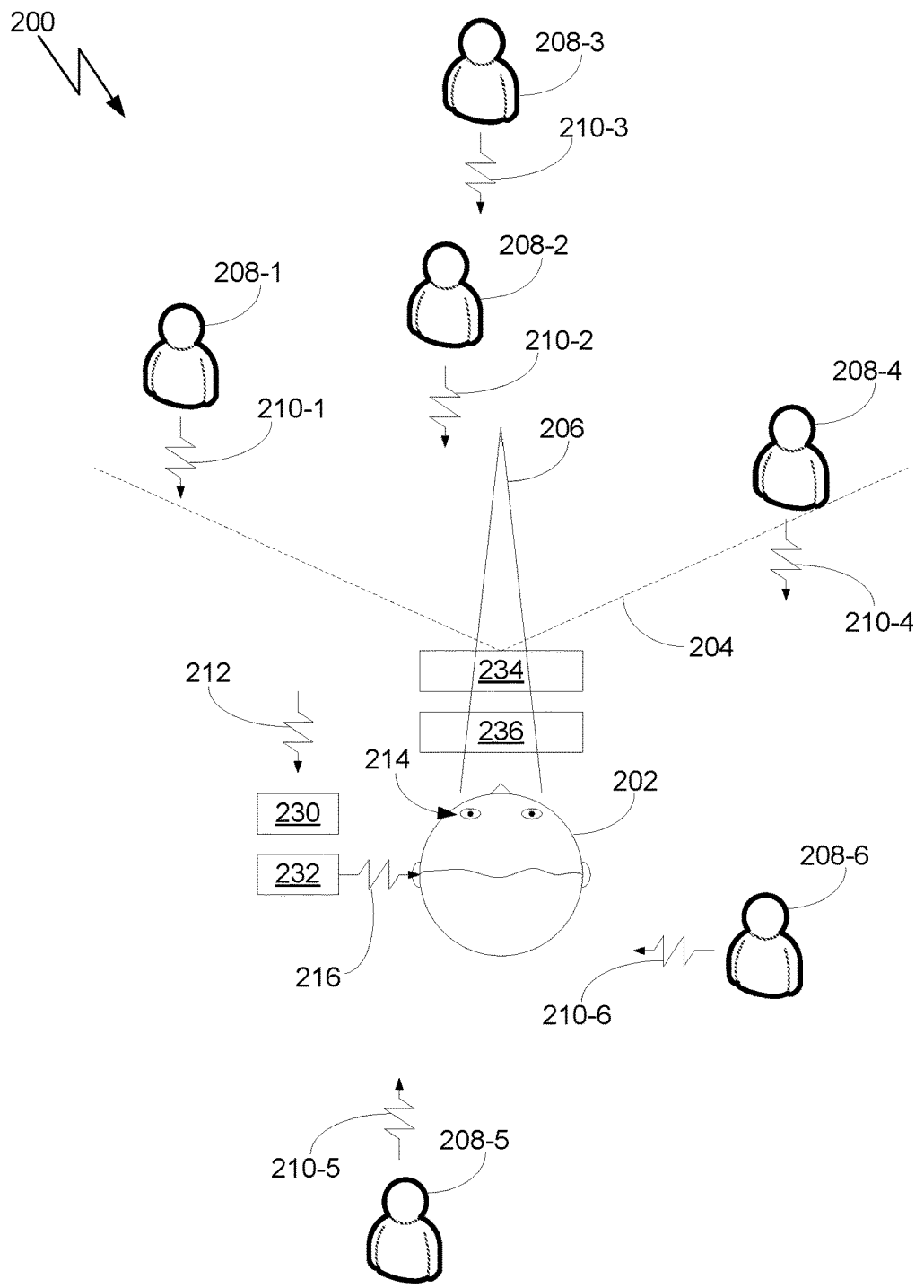
FIGS. 2A-2D illustrate the sound enhancement system of FIGS. 1A-1B continuously enhancing audio signals associated with various sources of interest, according to various embodiments.
Figure 2B:
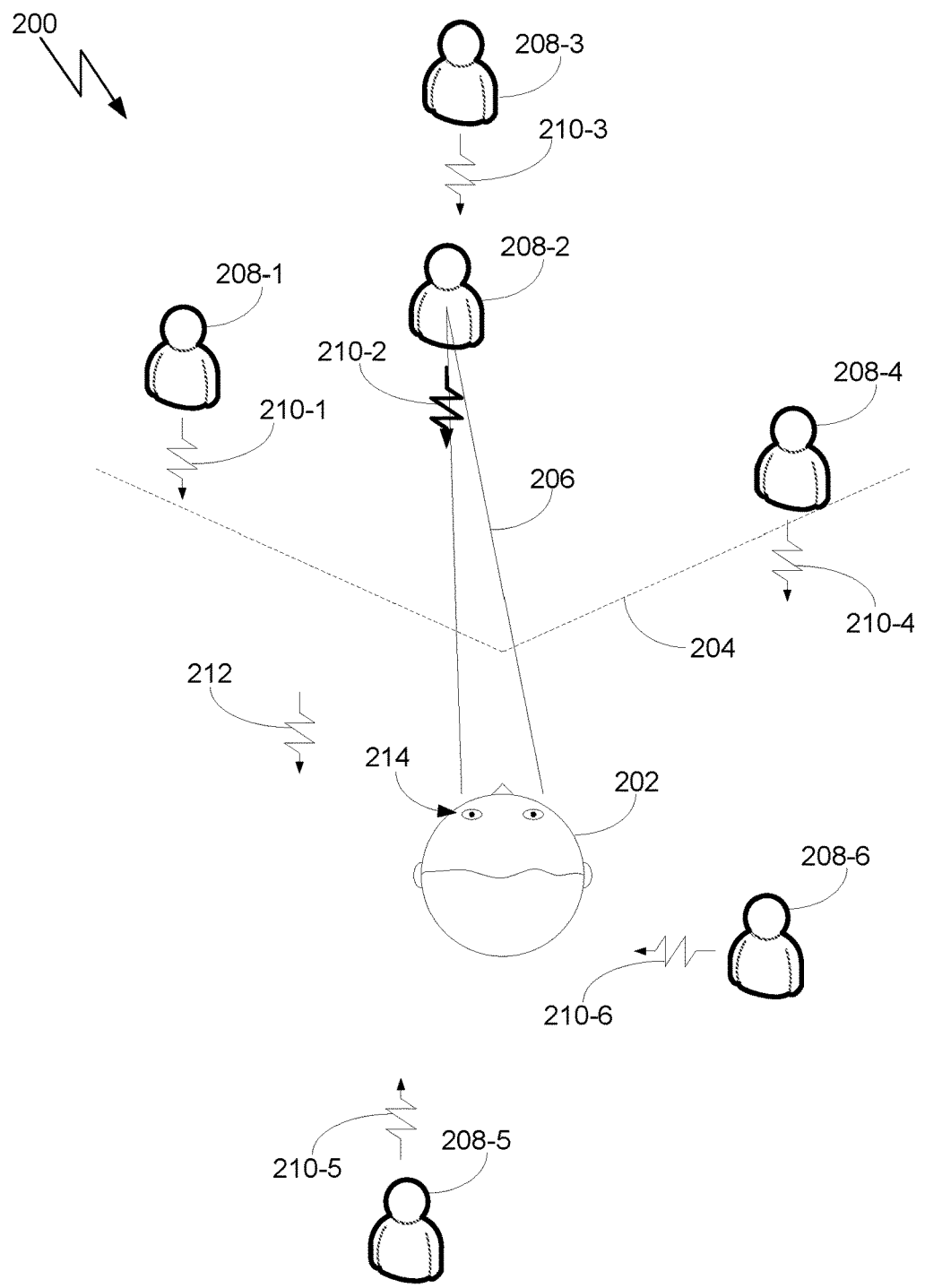
Figure 2C:
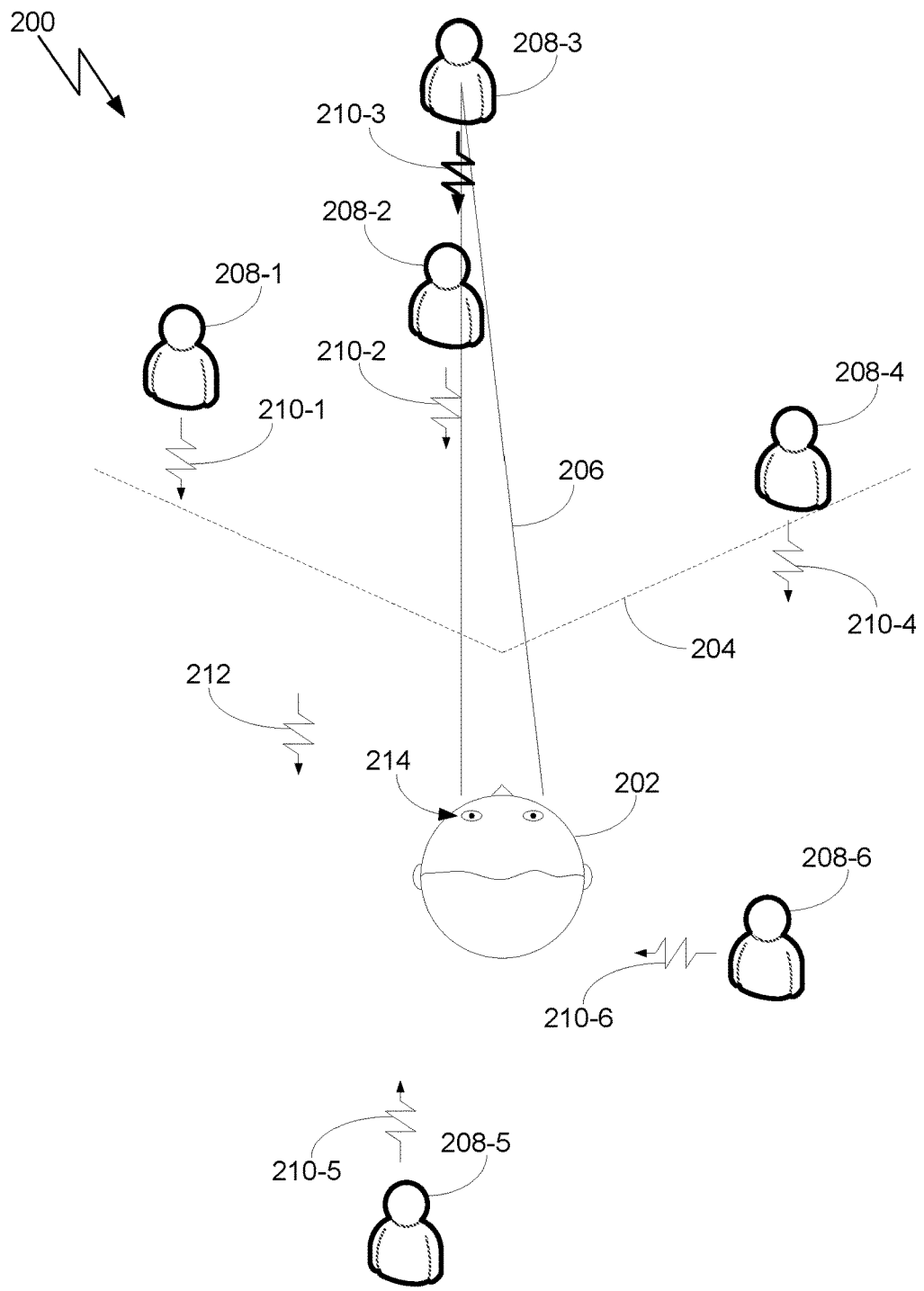

FIGS. 2A-2C illustrate the sound enhancement system of FIGS. 1A and/or 1B continuously enhancing audio signals associated with various sources of interest, according to various embodiments. As shown in FIG. 2A, a user 202 of sound enhancement system 100 is located in listening environment 200, in which multiple sources of sound produce sounds. For example, as shown in FIG. 2A listening environment 200 includes multiple persons 208 speaking, thereby producing respective audio signals 210. For example, audio signal 210-1 includes the speech of person 208-1, audio signal 210-2 includes the speech of person 208-2, and so forth. Listening environment 200 further includes background sound audio signal 212. User 202 in listening environment 200 may be wearing a wearable implementation (e.g., wearable implementation 170) of sound enhancement system 100. A forward imaging device 234 of outward sensor device(s) 134 (e.g., located on bridge of frame 172 as shown in FIG. 1B) of sound enhancement system 100 has a field of view 204 directed toward the front of user 202 (e.g., directed toward the front of frame 172) and captures images (e.g., still images, video) of at least a portion of the field of view 204. Imaging device 236 of inward sensor device(s) 136 (e.g., located on inside surface of rims of frame 172 as shown in FIG. 1B) of sound enhancement system 100 captures images of the eyes 214 of user 202; the field of view (not shown) of imaging device 236 is toward eyes 214. Microphone 230 of microphones 130 (e.g., located on rims of frame 172 as shown in FIG. 1B) capture audio signals 210 originating from the various persons 208 speaking in listening environment 200 and audio signal 212 of the background sounds of listening environment 200. Sound enhancement application 150 receives the audio signals captured by microphones 230 as a mix of audio signals 210 and 212. An audio output device 132 (e.g., headphones 232) outputs an output audio signal 216 to the ears of user 202.

Sound enhancement application 150 receives sensor data from inward sensor device(s) 136 (e.g., imaging device 236) and determines an eye gaze direction and an eye gaze depth of eyes 214. From the eye gaze direction and depth, sound enhancement application 150 determines an eye gaze focus

206 of user 202. As shown in FIG. 2A, eye gaze focus 206 of user 202 is not on any particular person 208 or any other source of sounds.

Sound enhancement application 150 also receives images (e.g., still images, video) of listening environment 200 from outward sensor device(s) 134 (e.g., imaging device 234). In particular, the images of listening environment 200 cover a portion of listening environment 200 that is within the field of view 204 of imaging device 234. The images include any possible sources of sounds that is in field of view 204. For example, in FIG. 2A persons 208-1, 208-2, 208-3, and 208-4 are in field of view 204, and images captured by imaging device 234 would include persons 208-1, 208-2, 208-3, and 208-4. Persons 208-5 and 208-6 are outside of field of view 204, and images captured by imaging device 234 would not include persons 208-5 and 208-6. Sound enhancement application 150, processing the images of listening environment 200, would recognize the faces of persons 208-1, 208-2, 208-3, and 208-4.

As shown in FIG. 2A, eye gaze focus 206 is not on any particular source. Accordingly, sound enhancement application 150 outputs an audio signal 216 that includes an un-separated mix of audio signals 210 and 212, received from microphones 230, to user via headphones 232.

Sound enhancement application 150 can continuously and/or periodically determine a current eye gaze focus 206 of user 202. Continuing in FIG. 2B, eye gaze focus 206 of user 202 has changed from that shown in FIG. 2A and is placed on person 208-2. Based on eye gaze focus 206 being placed on person 208-2, sound enhancement application 150 can determine that person 208-2 is the source of interest and can output an output audio signal 216 that enhances audio signal 210-2 originating from person 208-2 (e.g., output audio signal 216 includes just the isolated audio signal 210-2, output audio signal 216 includes a mix of audio signals 210 and 212 but audio signal 210-2 within the mix is amplified and/or the other sources of sound are suppressed). In some embodiments, user 202 can toggle output of isolated audio signal 210-2 versus the un-separated mix of audio signals 210 and 212 by changing the enhancement mode of sound enhancement application 150.

User 202 can further change eye gaze focus 206 and place eye gaze focus 206 onto a different source. Continuing in FIG. 2C, user 202 has placed eye gaze focus 206 onto person 208-3. Person 208-3 is located at a similar direction relative to user 202 as person 208-2, but person 208-3 is behind person 208-2 and is further away from user 202 than person 208-2. Because eye gaze focus 206 as determined by sound enhancement application 150 accounts for eye gaze depth, sound enhancement application 150 can distinguish eye gaze focus 206 being placed on person 208-3 versus person 208-2. For example, sound enhancement application 150 could, based on distance information associated with the images of listening environment 200 (e.g., distance per pixel included in a depth image of listening environment 200), recognize that persons 208-2 and 208-3 are located at different distances from user 202. Accordingly, sound enhancement application 150 can, based on the eye gaze depth, determine which of person 208-2 or 208-3 on which eye gaze focus 206 is placed. Sound enhancement application 150 can process audio signals 210 and 212 to distinguish and isolate audio signals 210-2 and 210-3 using the techniques disclosed herein. Based on eye gaze focus 206 being placed on person 208-3, sound enhancement application 150 can determine that person 208-3 is the source of interest and can output an output audio signal 216 that enhances audio signal 210-3 originating from person 208-3 (e.g., output audio signal 216 includes just the isolated audio signal 210-3, output audio signal 216 includes a mix of audio signals 210 and 212 but audio signal 210-3 within the mix is amplified and/or the other sources of sound are suppressed).

Figure 2D:
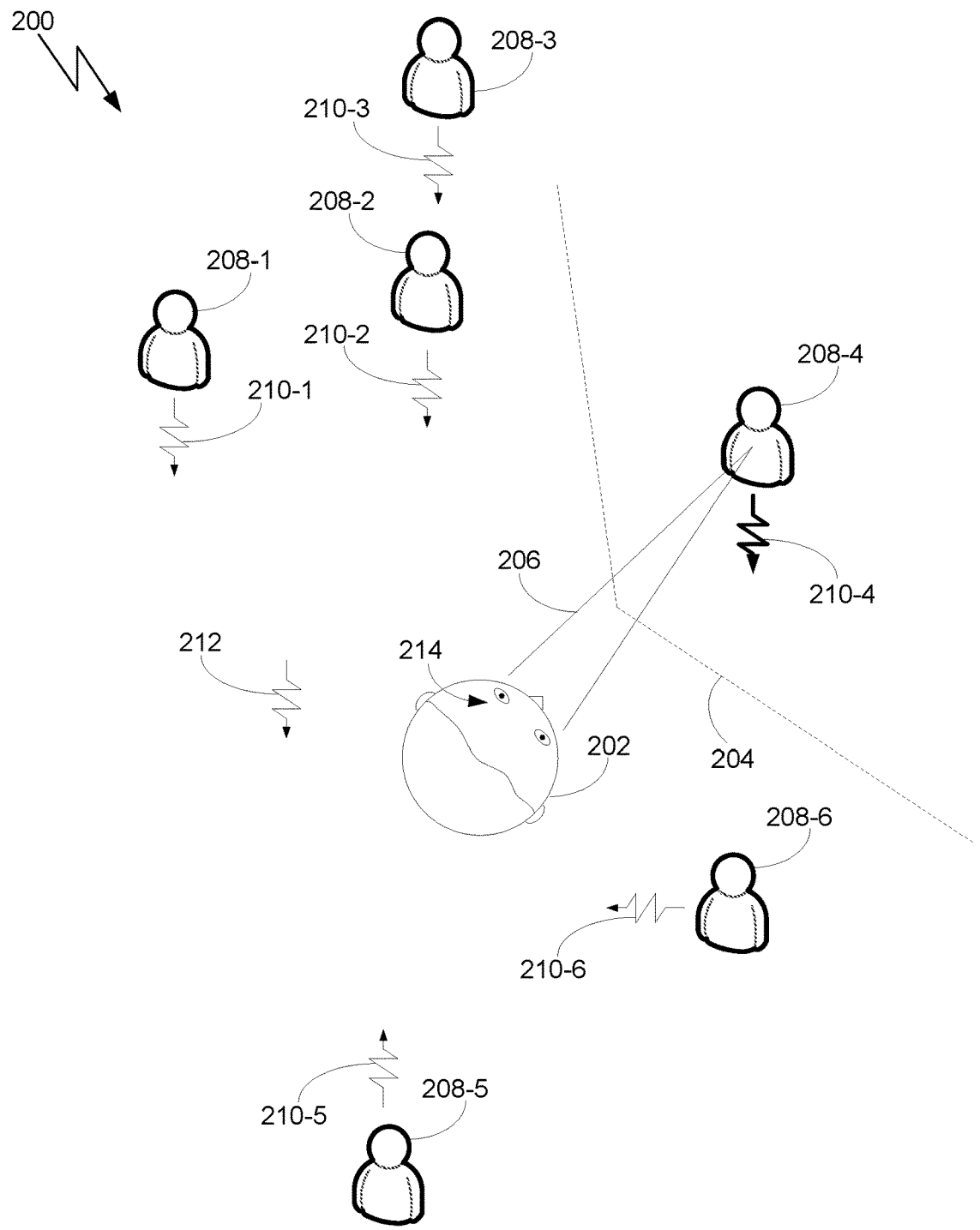

Continuing in FIG. 2D, user 202 has turned toward person 208-4, which also changes the orientation of field of view 204. As a result of the change in the orientation of field of view 204, persons 208-1 and 208-2 are no longer in field of view 204; persons 208-1 and 208-2 are not included in images captured by imaging device 234 with field of view 204 as shown in FIG. 2D. In some embodiments, sound enhancement application 150 ceases outputting isolated audio signal 210-3 based on person 208-3 no longer being in field of view 204 and/or eye gaze focus 206 no longer being placed on person 208-3. Further, user 202 has placed eye gaze focus 206 on person 208-4. Based on eye gaze focus 206 being placed on person 208-4, sound enhancement application 150 can determine that person 208-4 is the source of interest and can output an output audio signal 216 that enhances audio signal 210-4 originating from person 208-4 (e.g., output audio signal 216 includes just the isolated audio signal 210-4, output audio signal 216 includes a mix of audio signals 210 and 212 but audio signal 210-4 within the mix is amplified and/or the other sources of sound are suppressed). In some embodiments, a source whose face (e.g., human face, animal face) is not recognizable in the images captured by imaging device 234 because the source has turned his, her, or its face away from user 202 is considered the same as not being in field of view 204.

As shown in FIGS. 2A-2D, sound enhancement application 150 can monitor eye gaze focus 206 of user 202 to identify a current source of interest for user 202. Sound enhancement application 150 can process the received mix of audio signals 210 and 212, and optionally based on visual information in the images captured by imaging device 234 and additional sensor data from other outward sensor device(s) 134 as described herein, to isolate and separate audio signals 210 by specific source (e.g., by specific persons 208). Sound enhancement application 150 can then output the isolated audio signal originating from the current source of interest.

In some embodiments, when eye gaze focus 206 changes from being on a source to being not on any source, sound enhancement application 150 ceases enhancing the audio signal originating from the last source of interest. For example, if user 202 changes eye gaze focus 206 from being placed on person 208-4 (as in FIG. 2D) to being placed on no source in particular (as in FIG. 2A), sound enhancement application 150 would cease enhancing audio signal 210-4 originating from person 208-4. In some other embodiments, sound enhancement application 150 would continue to enhance audio signal 210-4 originating from person 208-4 even with the above-described change in eye gaze focus 206, as long as person 208-4 continues to be in field of view 204.

Figure 3A:
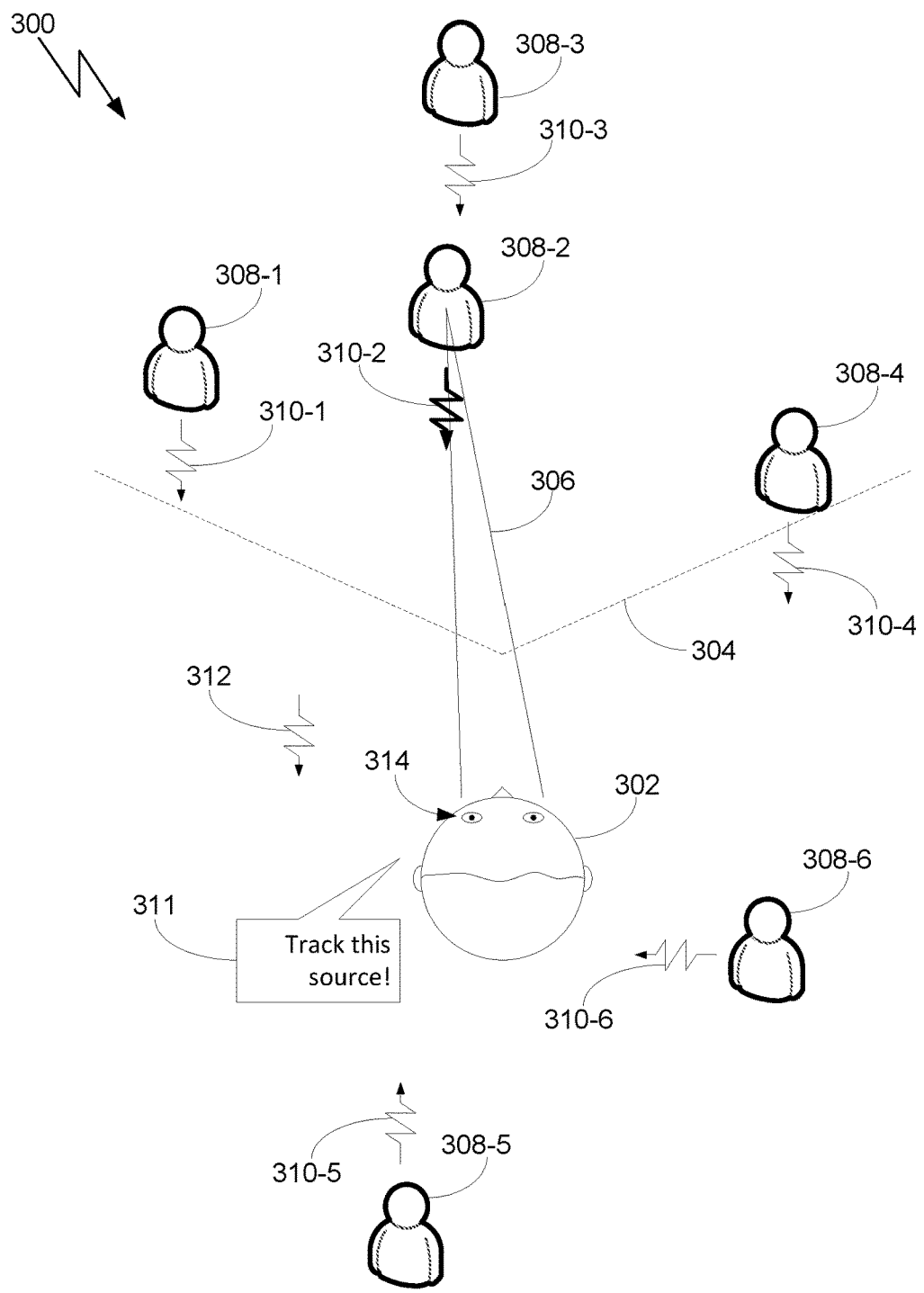
FIGS. 3A-3D illustrate the sound enhancement system of FIGS. 1A-1B tracking a source of interest and enhancing audio signals associated with the source of interest, according to various embodiments.

FIGS. 3A-3D illustrate the sound enhancement system of FIG. 1A tracking a source of interest and enhancing audio signals associated with the source of interest, according to various embodiments. In some embodiments, sound enhancement application 150 can track a source of interest and continue to enhance an audio signal originating from that source of interest even when the user shifts eye gaze focus away from that source of interest. As shown in FIG. 3A, a listening environment 300 includes user 302 of sound enhancement system 100 with eye gaze focus 306. A forward imaging device (not shown) of outward sensor device(s) 134 of sound enhancement system 100 has field of view 304. Listening environment 300 includes persons 308 speaking, thereby producing respective audio signals 310 that can be captured by microphones 130 of sound enhancement system 100.

As shown in FIG. 3A, eye gaze focus 306 of user 302 is placed on person 308-2 within field of view 304. Accordingly, sound enhancement application 150 determines that person 308-2 is the source of interest and proceeds to enhance audio signal 310-2 originating from person 308-2.

In some embodiments, sound enhancement application 150 can accept a user input to continue tracking or "locking onto" a source of interest. For example, user 302 may input a command (e.g., via a button in input devices 138, via a voice command captured by microphones 130) to select the current source of interest, person 308-2, for continued tracking. The continued tracking input may be a different input than the enhancement mode switch input described above. For example, if the enhancement mode switch input is a simple press of a button, then the continued tracking input could be a hold of the button for a predefined amount of time while eye gaze focus 306 is placed on the source of interest. As shown in FIG. 3A, user 302 issues a voice command 311 "Track this source!" to sound enhancement application 150 while eye gaze focus 306 is on person 308-2.

Figure 3B:
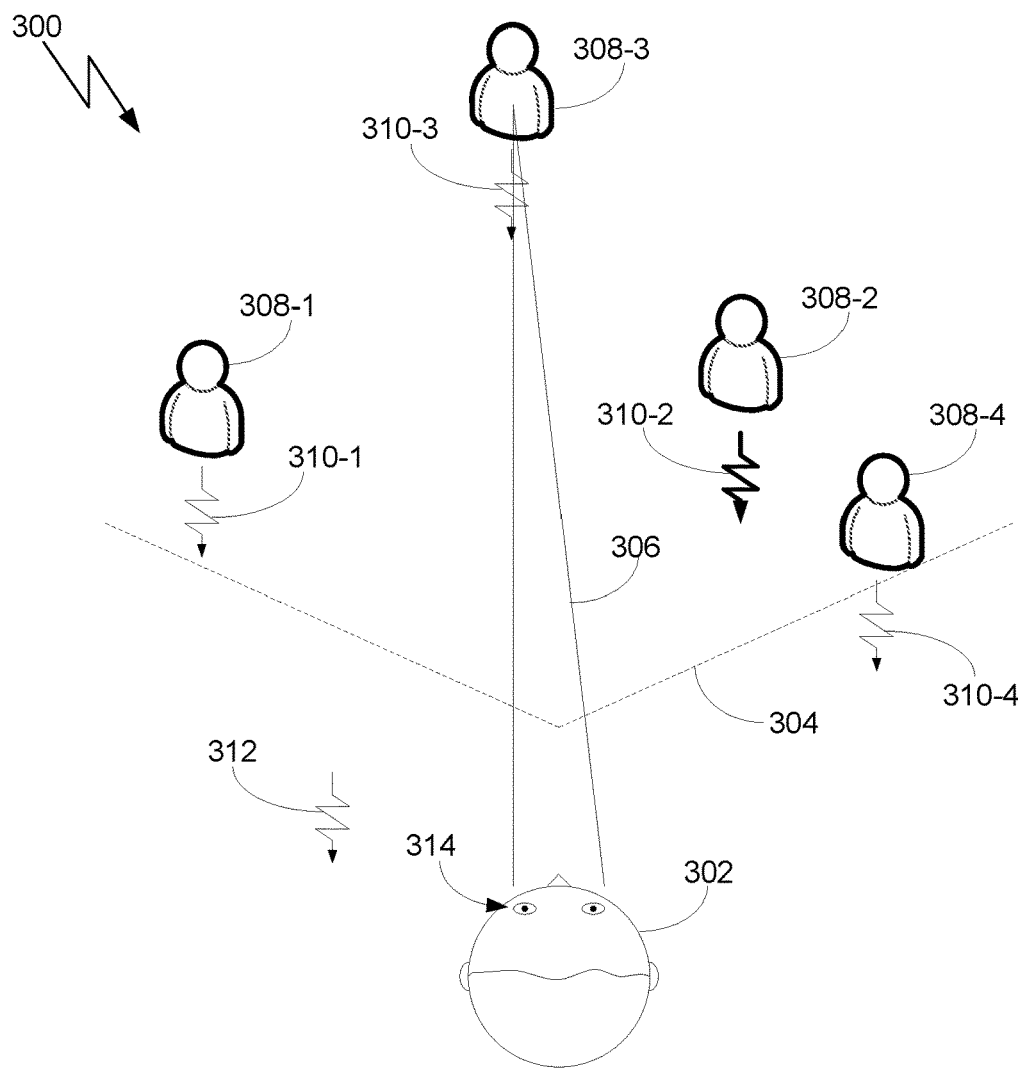
Figure 3B:

In response to voice command 311, sound enhancement application 150 "locks onto" person 308-2 and continues to enhance audio signal 310-2 even when eye gaze focus 306 changes, as long as person 308-2 remains in field of view 304. As shown in FIG. 3B, person 308-2 has moved within listening environment 300 and eye gaze focus 306 has been placed on another person 308-3. Because sound enhancement application 150 has "locked onto" person 308-2, sound enhancement application 150 still considers person 308-2 the source of interest and accordingly enhances audio signal 310-2.

Figure 3C:
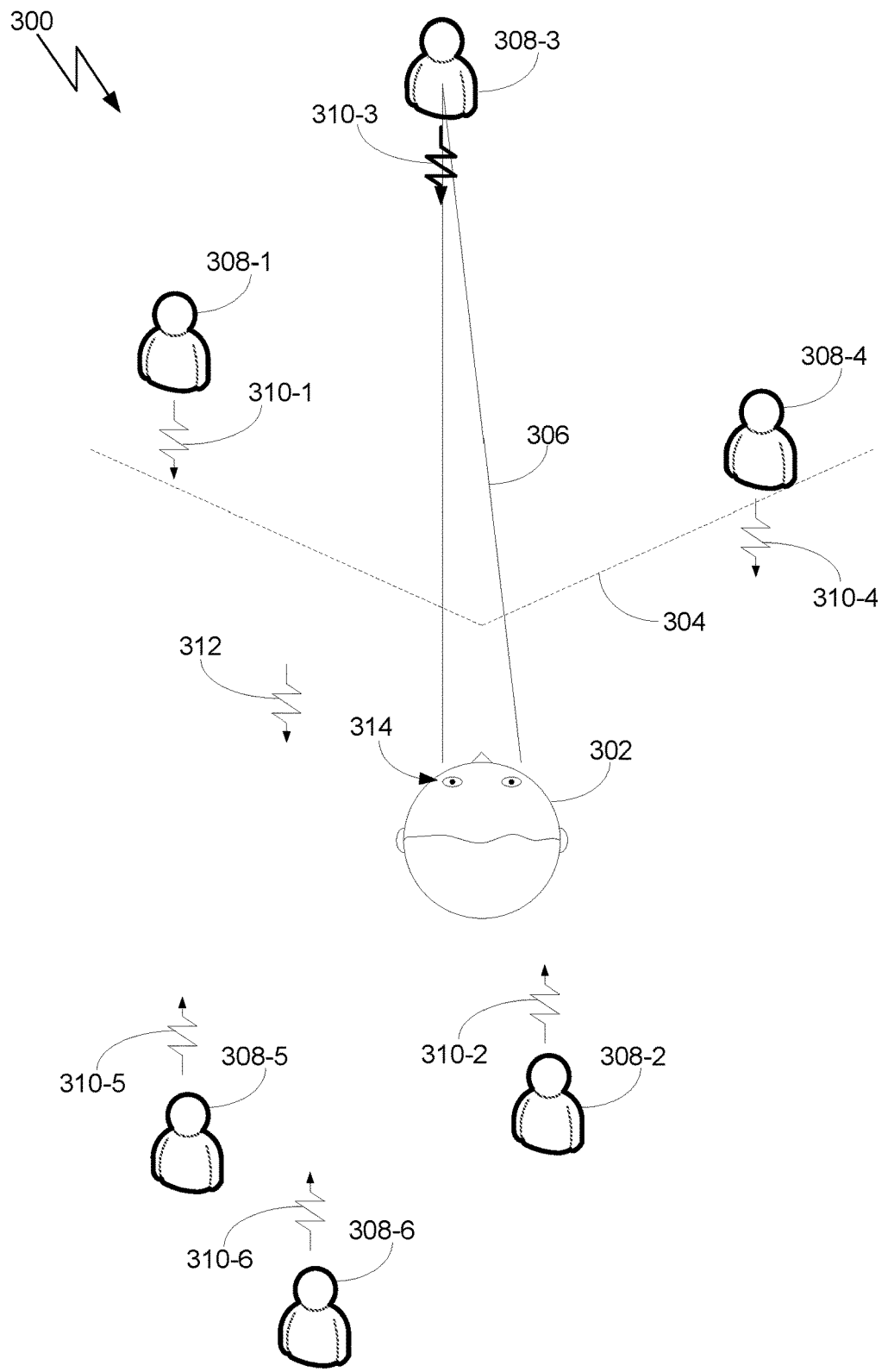

The "lock-on" by sound enhancement application 150 may be released by the locked-on source of interest being out of field of view 304 due to the source of interest moving out of field of view 304 or field of view 304 re-orienting away from the source of interest (e.g., user 302 turns away from person 308-2). As shown in FIG. 3C, person 308-2 has moved out of field of view 304. In response to person 308-2 moving out of field of view 304, sound enhancement application 150 ceases tracking person 308-2 and ceases enhancing audio signal 310-2; sound enhancement application 150 is no longer locked onto person 308-2. Instead, sound enhancement application 150 returns to determining the source of interest based on eye gaze focus 306 and enhancing an audio signal originating from the source of interest, as described above in conjunction with FIGS. 2A-2D. In some embodiments, sound enhancement application 150 can also release the lock-on in response to a user input (e.g., a button hold for a predefined amount of time, a voice command).

Figure 3D:
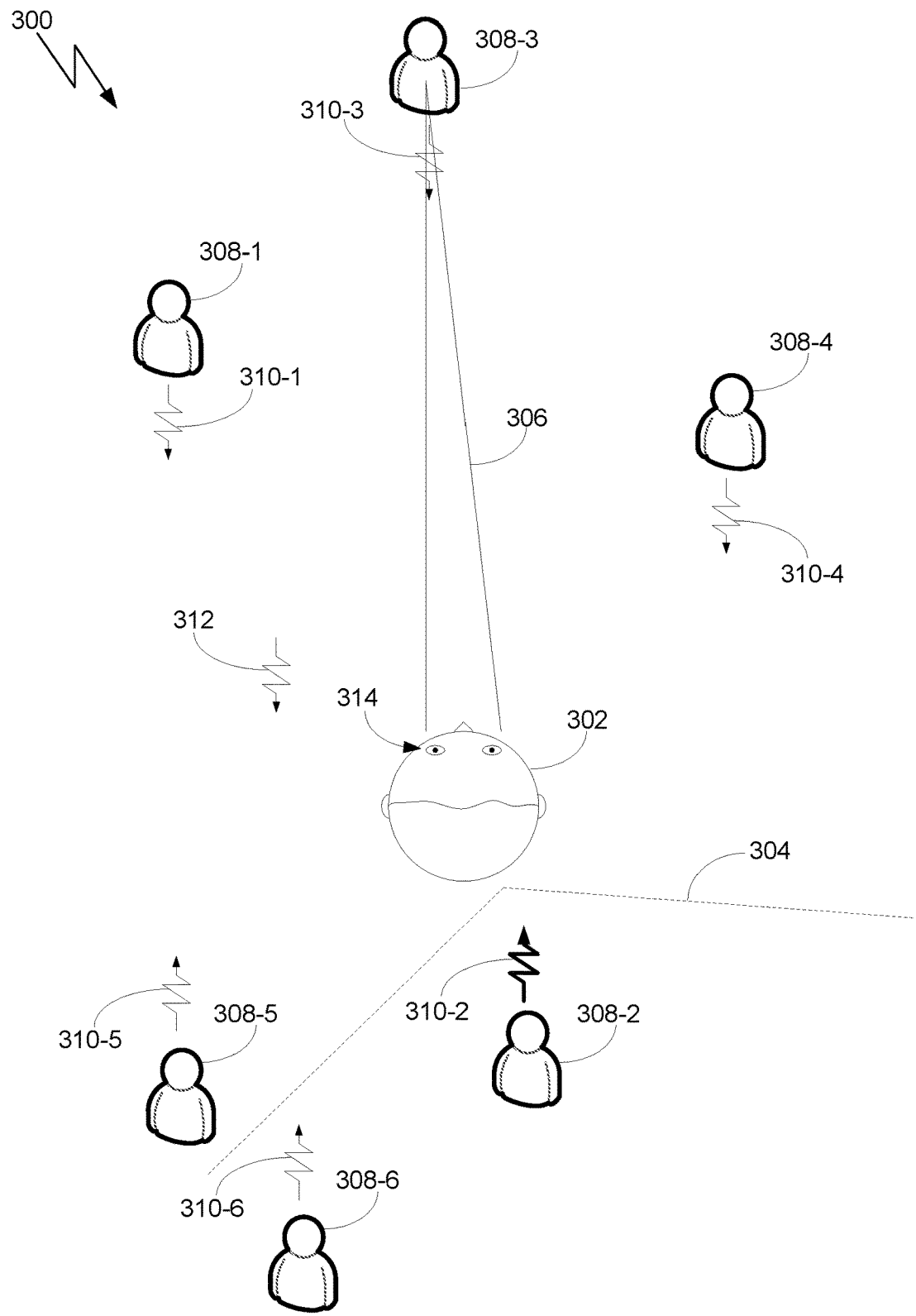

In some embodiments, outward sensor device(s) 134 include physical actuation capability (e.g., mechanical panning) and thus include the capability to re-orient the field of view. In particular, as the source of interest moves about or the head of the user is turned, sound enhancement application 150 can actuate an outward sensor device 134 to re-orient (e.g., pan across), such that the field of view of the outward sensor device 134 keeps the source of interest within the field of view. For example, after sound enhancement application 150 has locked onto person 308-2 as the source of interest as shown in FIGS. 3A-3B, person 308-2 can move about. As an alternative to determining a new source of interest, as in FIG. 3C, sound enhancement application 150 can pan outward sensor device(s) 134 to re-orient field of view 304 in order to keep person 308-2 within field of view 304, as shown in FIG. 3D. How far sound enhancement application 150 can reorient outward sensor device 134 to re-orient field of view 304 depends on the physical specifications of outward sensor device 134 (e.g., the specifications of the actuation mechanism). Additionally or alternatively, sound enhancement system 100 can have multiple outward sensor devices 134, each with a respective field of view. Sound enhancement application 150 can track person 308-2 across the fields of view of multiple outward sensor devices 134.

FIGS. 4A-4C illustrate the sound enhancement system of FIGS. 1A and/or 1B providing visual feedback indicating the source of interest whose audio signals are to be or are being enhanced, according to various embodiments. In some embodiments, sound enhancement system 100 includes display device(s) 140, and sound enhancement application 150 can display augmented reality content indicating the source of interest whose audio signals are to be or are being enhanced. As shown in FIG. 4A, a wearable frame 400 (e.g., frame 172) of sound enhancement system 100 includes left lens 402 and right lens 404. Wearable frame 400 may be worn by a user (not shown) in a listening environment. Both left lens 402 and right lens 404 include display devices 140, in particular transparent displays. That is, instead of lenses 402 and 404 being conventional eyeglass or sunglass lens (e.g., prescription lens, reading glass lens, bifocal lens, tinted lens), lenses 402 and 404 are transparent displays onto which sound enhancement application 150 can output augmented reality content and which the user can see through into the environment. As shown in FIG. 4A, persons 406 in the same listening environment as the user are visible through lenses 402 and 404. Outward sensor device(s) 134 and inward sensor device(s) 136 (not shown) may be mounted at various positions on frame 400. For example, a forward imaging device of outward sensor device(s) 134 may be attached on the front side (facing away from the user) of frame 400.

When sound enhancement application 150 determines that the eye gaze focus of the user is on a particular source that can be seen through lenses 402 or 404, sound enhancement application 150 can output an augmented reality border to display devices 140 around that source to indicate that that source is the current source of interest. As shown in FIG. 4A, highlight box 408 is displayed around person 406-5, indicating that person 406-5 is the current source of interest based on the eye gaze focus of the user, as determined by sound enhancement application 150. Highlight box 408 follows the eye gaze focus of the user; sound enhancement application 150 can display highlight box 408 around the current source of interest, if any, based on the current eye gaze focus of the user. In other embodiments, other forms of highlighting may be displayed instead of a highlight box 408. The other forms of highlighting may include, without limitation, a color displayed over the current source of interest, a glow or halo along the outline of the current of interest, an arrow pointing at the current source of interest, and so on.

As the eye gaze focus of the user, and the source of interest changes, sound enhancement application 150 can change the display position of highlight box 408. As shown in FIG. 4B, sound enhancement application 150 has determined that person 406-3 is the new source of interest based on the current eye gaze focus of the user. Accordingly, sound enhancement application 150 displays highlight box 408 around person 406-3. As person 406-3 moves, sound enhancement application 150 can move highlight box 408 along with person 406-3.

As described above in conjunction with FIGS. 3A-3D, sound enhancement application 150 can lock onto a current source of interest and track that source of interest even as the eye gaze focus changes and the tracked source of interest moves. Accordingly, the user can command sound enhancement application 150 to lock onto person 406-3 as the source of interest. As shown in FIG. 4C, person 406-3 has moved from the position shown in FIG. 4B to a position in the left periphery of the field of vision of the user. Accordingly, person 406-3 is visible through left lens 402 but not visible through right lens 404. Because sound enhancement application 150 has locked onto person 406-3 in accordance to the user command, highlight box 408 continues to be displayed around person 406-3 even if the current eye gaze focus of the user is not on person 406-3. If person 406-3 moves out of the field of view of outward sensor device(s) 134, sound enhancement application 150 releases the lock-on and cease displaying highlight box 408 around person 406-3.

In some embodiments, highlight box 408 can be manipulated by the user. For example, the user can make an input via an input device 138 to move highlight box 408 to highlight another person 406 seen through lenses 402 and 404. The user can then make an input to lock onto the newly highlighted person 406 (e.g., voice command 311, a button press-and-hold) to select the newly highlighted person 406 as the source of interest regardless of the current eye gaze focus of the user. Additionally, in some embodiments, if the current source of interest has moved out of view of lenses 402 and 404, but is still in the field of view of outward sensor device(s) 134, then sound enhancement application 150 can display on lenses 402 and/or 404 an indicator (e.g., an arrow) of the direction where the current source of interest is located relative to the user.

Figure 5:
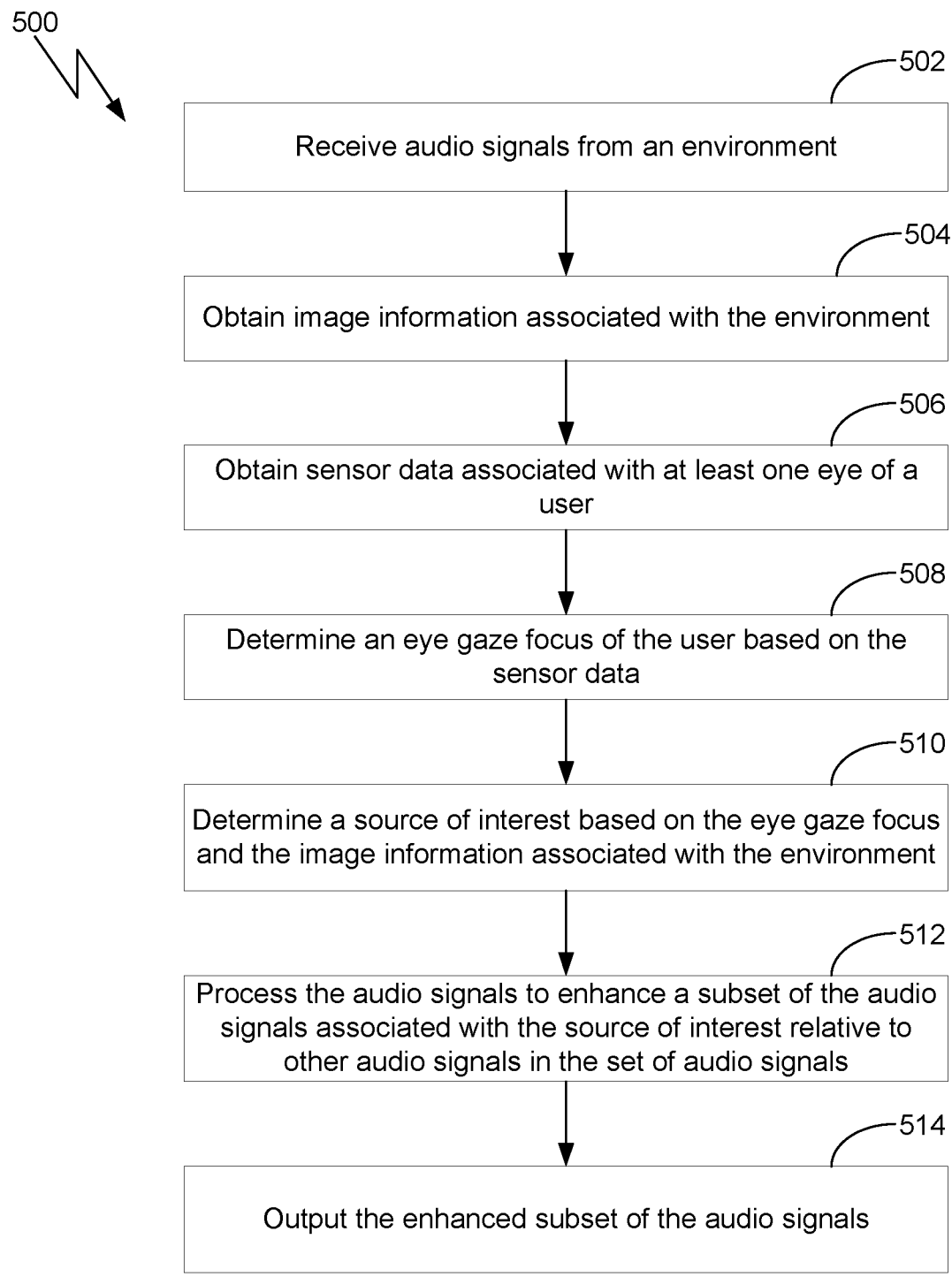
FIG. 5 is a flow diagram of method steps for enhancing audio signals associated with a specific source of interest, according to various embodiments.

FIG. 5 is a flow diagram of method steps for enhancing audio signals associated with a specific source of interest, according to various embodiments. Although the method steps are described with respect to the systems of FIGS. 1A-4C, persons skilled in the art will understand that any system configured to perform the method steps, in any order, falls within the scope of the various embodiments.

As shown, method 500 begins at step 502, where sound enhancement application 150 of a sound enhancement system 100 receives audio signals from an environment. Sound enhancement application 150 receives from microphones 130 a mix of audio signals from multiple sources. The mix of audio signals may include audio signals originating from multiple persons and background sounds.

At step 504, sound enhancement application 150 obtains image information associated with the environment. Sound enhancement application 150 receives from outward sensor device(s) 134 image information (e.g., still images, video) of the environment (e.g., images of the environment forward from the user of sound enhancement system 100).

At step 506, sound enhancement application 150 obtains sensor data associated with at least one eye of a user. Sound enhancement application 150 receives from inward sensor device(s) 136 sensor data measuring and/or monitoring characteristics (e.g., eye position, eye movement, eye vergence) of at least one eye of the user. In various embodiments, the sensor data measures and/or monitors characteristics of both eyes of the user. The sensor data may include images (e.g., still images, video) of the eye(s) and/or electrooculography data.

At step 508, sound enhancement application 150 determines an eye gaze focus of the user based on the sensor data. Sound enhancement application 150 determines an eye gaze direction and an eye gaze depth of the user based on the images of the eye(s), electrooculography data, etc., and determines an eye gaze focus based on the eye gaze direction and eye gaze depth.

At step 510, sound enhancement application 150 determines a source of interest based on the eye gaze focus and the image information associated with the environment. Sound enhancement application 150 processes the image information to recognize possible sources currently in the environment. Sound enhancement application 150 compares the eye gaze focus to the image information to determine a recognized source on which the eye gaze focus is currently placed, and sound enhancement application 150 determines that source as the source of interest.

At step 512, sound enhancement application 150 processes the audio signals to enhance a subset of the audio signals associated with the source of interest relative to other audio signals in the set of audio signals. Sound enhancement application 150 processes the audio signals, using the audio signals and the image information, to separate the audio signals by source (e.g., extracting and combining audio features and visual features from the audio signals and the image information, respectively). Sound enhancement application 150 enhances the separated audio signal originating from the source of interest relative to audio signals originating from sources other than the source of interest.

At step 514, sound enhancement application 150 outputs the enhanced subset of the audio signals. Sound enhancement application 150 outputs the enhanced audio signal originating from the source of interest to audio output device 132, for output to the user.

In sum, an audio system performs audio-visual enhancement of sounds originating from a particular source determined based on an eye gaze focus of a user. The audio system determines an eye gaze focus, which includes an eye gaze direction and an eye gaze depth, of a user of the audio system based on image information, electrooculography data, and/or eye vergence data. The audio system captures image information of the environment and audio signals from the environment. The audio system determines a source of interest, identifies audio signals originating from the source of interest from amongst the captured audio signals, and enhances the audio signals associated with the source of interest based on the eye gaze focus, the image information of the environment, and the captured audio signals. The audio system can also provide to the user visual feedback indicating the sound source to be or being enhanced. In some embodiments, the audio system can enhance human speech and non-human sounds associated with certain visual cues. The audio system can be implemented in a wearable form factor. The audio system can further track the source of interest as the source of interest moves about. The audio system can also display a highlight indicator in augmented reality to indicate the current source of interest.

A technical advantage and improvement of the disclosed techniques is that sounds associated with a source of interest, including human and non-human sources, can be more precisely enhanced, compared to conventional techniques. Accordingly, desirable sounds can be provided to the user more precisely, facilitating better focus on the desired sounds. Another advantage and improvement is that the determined sound source of interest is explicitly identified to the user. Accordingly, the user can more efficiently confirm or change the sound source of interest. A further advantage and improvement is that the source of interest can be tracked, thus facilitating enhancement of sounds originating from the source of interest without requiring that the source of interest and/or the user remain stationary.

1. In some embodiments, a computer-implemented method comprises acquiring image information associated with an environment; acquiring, from one or more sensors, sensor data associated with a gaze of a user; determining a source of interest based on the image information and the sensor data; processing a set of audio signals associated with the environment based on the image information to identify an audio signal associated with the source of interest; enhancing the audio signal associated with the source of interest relative to other audio signals in the set of audio signals; and outputting the enhanced audio signal associated with the source of interest to the user.

2. The method of clause 1, wherein the image information comprises images of a portion of the environment in front of the user.

3. The method of clauses 1 or 2, wherein determining the source of interest comprises processing the image information to recognize a plurality of sources in the environment, wherein the source of interest is included in the plurality of sources.

4. The method of any of clauses 1-3, wherein the sensor data comprises at least one of images of at least one eye of the user or electrooculography data associated with the at least one eye of the user.

5. The method of any of clauses 1-4, wherein determining the source of interest comprises determining an eye gaze focus of the user based on the sensor data.

6. The method of any of clauses 1-5, wherein determining the source of interest further comprises comparing the eye gaze focus to the image information to determine the source of interest.

7. The method of any of clauses 1-6, wherein determining the eye gaze focus comprises determining an eye gaze direction and an eye gaze depth of the user.

8. The method of any of clauses 1-7, wherein determining the eye gaze depth comprises determining an eye vergence of the user.

9. The method of any of clauses 1-8, wherein processing the set of audio signals associated with the environment based on the image information to identify the audio signal associated with the source of interest comprises separating the set of audio signals by source.

10. The method of any of clauses 1-9, wherein processing the set of audio signals associated with the environment based on the image information to identify the audio signal associated with the source of interest comprises extracting a plurality of visual features from the image information; extracting a plurality of audio features from the set of audio signals; combining a first visual feature included in the visual features with a first audio feature included in the audio features to generate a first audio-visual feature combination; and separate the audio signal associated with the source of interest from the other audio signals in the set of audio signals based on the first audio-visual feature combination.

11. In some embodiments, a system comprises a microphone; an audio output device; an outward sensor device; an inward sensor device; a memory storing an application; and a processor that, when executing the application, is configured to acquire, via the outward sensor device, image information associated with an environment; acquire, via the inward sensor device, sensor data associated with a gaze of a user; determine a source of interest based on the image information and the sensor data; separate a set of audio signals associated with the environment based on the image information to isolate an audio signal associated with the source of interest; and output the isolated audio signal associated with the source of interest to the user.

12. The system of clause 11, wherein the outward sensor device has a field of view, and wherein the processor, when executing the application, is further configured to determine that the source of interest has ceased to be in the field of view; and based on the determination that the source of interest has ceased to be in the field of view, cease outputting the isolated audio signal associated with the source of interest to the user.

13. The system of clauses 11 or 12, wherein the outward sensor device has a field of view, and wherein the processor, when executing the application, is further configured to determine that the source of interest is moving relative to the system; and based on the determination that the source of interest is moving, actuate the outward sensor device to reorient the field of view to maintain the source of interest within the field of view.

14. The system of any of clauses 11-13, wherein separating the set of audio signals associated with the environment based on the image information comprises separating, via a neural network, the set of audio signals based on a plurality of audio features extracted from the set of audio signals and a plurality of visual features extracted from the image information.

15. The system of any of clauses 11-14, wherein determining the source of interest comprises determining an eye gaze focus of the user based on the sensor data.

16. The system of any of clauses 11-15, wherein the processor, when executing the application, is further configured to track the source of interest; determine that the eye gaze focus has ceased to be on the source of interest; and continue to track the source of interest.

17. The system of any of clauses 11-16, wherein determining the source of interest comprises recognizing one or more sources in the image information, wherein the source of interest is included in the one or more sources.

18. In some embodiments, one or more non-transitory computer-readable storage media include instructions that, when executed by one or more processors, cause the one or more processors to perform the steps of acquiring image information associated with an environment; acquiring, from one or more sensors, sensor data associated with a gaze of a user; determining a source of interest based on the image information and the sensor data; processing a set of audio signals associated with the environment based on the image information to identify an audio signal associated with the source of interest; enhancing the audio signal associated with the source of interest relative to other audio signals in the set of audio signals; and outputting the enhanced audio signal associated with the source of interest to the user.

19. The one or more computer-readable storage media of clause 18, further comprising instructions that, when executed by the one or more processors, cause the one or more processors to perform the step of processing the image information to recognize a plurality of sources in the environment.

20. The one or more computer-readable storage media of clauses 18 or 19, wherein determining the source of interest comprises determining an eye gaze focus of the user based on the sensor data; and comparing the eye gaze focus to the image information to determine the source of interest included in the plurality of sources.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
acquiring, using an imaging device, image information associated with an environment;
acquiring, from one or more sensors, sensor data associated with a gaze of a user;
determining a source of interest based on the image information and the sensor data;
processing a set of audio signals associated with the environment based on the image information to identify an audio signal associated with the source of interest;
enhancing the audio signal associated with the source of interest relative to other audio signals in the set of audio signals;
outputting the enhanced audio signal associated with the source of interest to the user;
determining that the source of interest is moving; and
in response to the determination that the source of interest is moving, actuating the imaging device to maintain the source of interest within a field of view of the imaging device.

2. The method of claim 1, wherein the image information comprises images of a portion of the environment in front of the user.

3. The method of claim 1, wherein the step of determining the source of interest comprises processing the image information to recognize a plurality of sources in the environment, wherein the source of interest is included in the plurality of sources.

4. The method of claim 1, wherein the sensor data comprises at least one of images of at least one eye of the user or electrooculography data associated with the at least one eye of the user.

5. The method of claim 1, wherein the step of determining the source of interest comprises determining an eye gaze focus of the user based on the sensor data.

6. The method of claim 5, wherein the step of determining the source of interest further comprises comparing the eye gaze focus to the image information to determine the source of interest.

7. The method of claim 5, wherein the step of determining the eye gaze focus comprises determining an eye gaze direction and an eye gaze depth of the user.

8. The method of claim 7, wherein the step of determining the eye gaze depth comprises determining an eye vergence of the user.

9. The method of claim 1, wherein the step of processing the set of audio signals associated with the environment based on the image information to identify the audio signal associated with the source of interest comprises separating the set of audio signals by source.

10. The method of claim 1, wherein the step of processing the set of audio signals associated with the environment based on the image information to identify the audio signal associated with the source of interest comprises:
   extracting a plurality of visual features from the image information;
   extracting a plurality of audio features from the set of audio signals;
   combining a first visual feature included in the visual features with a first audio feature included in the audio features to generate a first audio-visual feature combination; and
   separate the audio signal associated with the source of interest from the other audio signals in the set of audio signals based on the first audio-visual feature combination.

11. A system, comprising:
   a microphone;
   an audio output device;
   an imaging device;
   an inward sensor device;
   a memory storing an application; and
   a processor that, when executing the application, is configured to:
      acquire, via the imaging device, image information associated with an environment;
      acquire, via the inward sensor device, sensor data associated with a gaze of a user;
      determine a source of interest based on the image information and the sensor data;
      separate a set of audio signals associated with the environment based on the image information to isolate an audio signal associated with the source of interest;
      output the isolated audio signal associated with the source of interest to the user;
      determine that the source of interest is moving; and
      in response to the determination that the source of interest is moving, actuate the imaging device to maintain the source of interest within a field of view of the imaging device.

12. The system of claim 11, wherein the outward sensor imaging device has a field of view, and wherein the processor, when executing the application, is further configured to:
   determine that the source of interest has ceased to be in the field of view; and
   based on the determination that the source of interest has ceased to be in the field of view, cease outputting the isolated audio signal associated with the source of interest to the user.

13. The system of claim 11, wherein the step of separating the set of audio signals associated with the environment based on the image information comprises separating, via a neural network, the set of audio signals based on a plurality of audio features extracted from the set of audio signals and a plurality of visual features extracted from the image information.

14. The system of claim 11, wherein the step of determining the source of interest comprises determining an eye gaze focus of the user based on the sensor data.

15. The system of claim 14, wherein the processor, when executing the application, is further configured to:
   track the source of interest;
   determine that the eye gaze focus has ceased to be on the source of interest; and
   continue to track the source of interest.

16. The system of claim 11, wherein the step of determining the source of interest comprises recognizing one or more sources in the image information, wherein the source of interest is included in the one or more sources.

17. One or more non-transitory computer-readable storage media including instructions that, when executed by one or more processors, cause the one or more processors to perform the steps of:
   acquiring, using an imaging device, image information associated with an environment;
   acquiring, from one or more sensors, sensor data associated with a gaze of a user;
   determining a source of interest based on the image information and the sensor data;
   processing a set of audio signals associated with the environment based on the image information to identify an audio signal associated with the source of interest;
   enhancing the audio signal associated with the source of interest relative to other audio signals in the set of audio signals;
   outputting the enhanced audio signal associated with the source of interest to the user;
   determining that the source of interest is moving; and
   in response to the determination that the source of interest is moving, actuating the imaging device to maintain the source of interest within a field of view of the imaging device.

18. The one or more computer-readable storage media of claim 17, further comprising instructions that, when executed by the one or more processors, cause the one or more processors to perform the step of processing the image information to recognize a plurality of sources in the environment.

19. The one or more computer-readable storage media of claim 18, wherein the step of determining the source of interest comprises:
   determining an eye gaze focus of the user based on the sensor data; and
   comparing the eye gaze focus to the image information to determine the source of interest included in the plurality of sources.

* * * * *

UNITED STATES PATENT AND TRADEMARK OFFICE
CERTIFICATE OF CORRECTION

| | |
|---|---|
| PATENT NO. | : 11,482,238 B2 |
| APPLICATION NO. | : 16/934791 |
| DATED | : October 25, 2022 |
| INVENTOR(S) | : Evgeny Burmistrov et al. |

It is certified that error appears in the above-identified patent and that said Letters Patent is hereby corrected as shown below:

In the Claims

Column 21, Claim 12, Line 50, please delete "outward sensor".

Signed and Sealed this
Sixth Day of December, 2022

*Katherine Kelly Vidal*

Katherine Kelly Vidal
*Director of the United States Patent and Trademark Office*